US011196075B2

(12) United States Patent
Onuma et al.

(10) Patent No.: US 11,196,075 B2
(45) Date of Patent: Dec. 7, 2021

(54) FUEL CELL SYSTEM AND METHOD FOR OPERATING THE SAME, AND ELECTROCHEMICAL SYSTEM AND METHOD FOR OPERATING THE SAME

(71) Applicant: Panasonic Intellectual Property Management Co., Ltd., Osaka (JP)

(72) Inventors: Shigenori Onuma, Kyoto (JP); Tomohiro Kuroha, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1 day.

(21) Appl. No.: 16/533,461

(22) Filed: Aug. 6, 2019

(65) Prior Publication Data
US 2020/0099084 A1 Mar. 26, 2020

(30) Foreign Application Priority Data
Sep. 21, 2018 (JP) .............................. JP2018-177507

(51) Int. Cl.
*H01M 8/0432* (2016.01)
*H01M 8/22* (2006.01)
(Continued)

(52) U.S. Cl.
CPC ....... *H01M 8/222* (2013.01); *H01M 8/04029* (2013.01); *H01M 8/04044* (2013.01); *H01M 8/04089* (2013.01); *H01M 50/10* (2021.01)

(58) Field of Classification Search
CPC .................................. H01M 8/04; H01M 8/10
See application file for complete search history.

(56) References Cited

U.S. PATENT DOCUMENTS

2010/0248056 A1* 9/2010 Yaguchi .............. H01M 8/2475
429/434
2011/0217603 A1* 9/2011 Otsuka ................ H01M 8/2428
429/413
(Continued)

FOREIGN PATENT DOCUMENTS

EP        2365568 A1     9/2011
JP        2006-134662    5/2006
(Continued)

OTHER PUBLICATIONS

The Extended European Search Report dated Feb. 17, 2020 for the related European Patent Application No. 19196680.3.

*Primary Examiner* — James Lee
(74) *Attorney, Agent, or Firm* — McDermott Will and Emery LLP

(57) ABSTRACT

A fuel cell system includes a fuel cell stack constituted by cells, each of the cells includes a fuel electrode, an air electrode, and an electrolyte, and generate electric power through a reaction of a fuel gas and air, a casing that houses the fuel cell stack, a temperature detector that detects a first temperature, the first temperature is a temperature of the fuel cell stack or inside the casing, and a controller. The controller controls based on the first temperature so as to allow an operation at a first predetermined temperature. The controller controls such that the first temperature reaches a temperature higher than or equal to a second predetermined temperature for a predetermined time. The second predetermined temperature is a temperature at which 475° C. embrittlement that occurs on stainless steel is eliminated. The first predetermined temperature is lower than the second predetermined temperature.

11 Claims, 11 Drawing Sheets

(51) Int. Cl.
*H01M 8/04029* (2016.01)
*H01M 8/04044* (2016.01)
*H01M 8/04089* (2016.01)
*H01M 50/10* (2021.01)

(56) References Cited

U.S. PATENT DOCUMENTS

2013/0209904 A1* 8/2013 Liu .................... H01M 8/0606
429/420
2018/0294489 A1 10/2018 Morikawa

FOREIGN PATENT DOCUMENTS

| | | |
|---|---|---|
| JP | 2009-185387 | 8/2009 |
| WO | 2016/178394 | 11/2016 |

* cited by examiner

FUEL CELL SYSTEM AND METHOD FOR OPERATING THE SAME, AND ELECTROCHEMICAL SYSTEM AND METHOD FOR OPERATING THE SAME

BACKGROUND

1. Technical Field

The present disclosure relates to a fuel cell system and a method for operating the fuel cell system, and an electrochemical system and a method for operating the electrochemical system.

2. Description of the Related Art

The operating temperature of known fuel cells, in particular, solid oxide fuel cells (SOFCs) is a high temperature of about 600° C. or higher. Therefore, in fuel cells operated at a temperature of 600° C. or higher, stainless steel is used as a material for a fuel cell stack, a reformer, and a heat exchanger and a casing (hereafter referred to as a hot box (HB)) including these members therein from the viewpoint of cost and durability (e.g., Japanese Unexamined Patent Application Publication No. 2009-185387 (Patent Document 1)).

Patent Document 1 proposes a ferrite stainless steel for separators of solid oxide fuel cells described below for the purpose of preventing oxidation of a separator (conductive member) in a steam atmosphere.

That is, Patent Document 1 proposes a ferrite stainless steel having a composition containing C: 0.03 mass % or less, Si: 1.0 mass % or less, Mn: 1.5 mass % or less, S: 0.01 mass % or less, N: 0.03% or less, Cr: 11.0 to 20.0 mass %, Mo: 3.0 mass % or less, and Ca: 0.001 to 0.01 mass %, the balance being substantially Fe. This ferrite stainless steel is mechanically polished so as to have a mechanically polished surface having a surface roughness Ra of 0.05 to 50 µm as defined in JIS B0601.

The ferrite stainless steel for separators of solid oxide fuel cells in Patent Document 1 may further contain one or more of Cu: 1.5 mass % or less, Nb: 0.05 to 0.80 mass %, Ti: 0.03 to 0.50 mass %, Y: 0.001 to 0.1 mass %, and rare-earth element: 0.001 to 0.1 mass %.

SUMMARY

In the above related art, the Cr content in the ferrite stainless steel is set to 20 mass % or less to suppress the 475° C. embrittlement susceptibility. Specifically, in the related art, the Cr content in the stainless steel is set to 11 mass % or more and 20 mass % or less. However, it is generally known that 475° C. embrittlement occurs at a Cr content of more than 10.5 mass %. Therefore, if the Cr content is 11 mass % or more as in the related art, 475° C. embrittlement cannot be sufficiently suppressed.

The related art also proposes that in order to suppress damage due to steam oxidation in a high-temperature atmosphere, an oxide film mainly containing a Cr-based oxide be formed on a surface of the stainless steel and this oxide film be stabilized. To stabilize the oxide film, other components are added to the stainless steel and surface polishing or the like is also performed. If other components are added to the stainless steel or surface polishing is performed, the cost increases. In particular, if surface polishing is performed, the surface is altered as a result of long-time operation of fuel cells, and thus embrittlement resistance cannot be maintained.

One non-limiting and exemplary embodiment provides a fuel cell system including stainless steel members that can be prevented from being broken because of the influence of 475° C. embrittlement.

In one general aspect, the techniques disclosed here feature a fuel cell system includes a fuel cell stack constituted by cells, each of the cells includes a fuel electrode, an air electrode, and an electrolyte, and generate electric power through a reaction of a fuel gas and air, a casing that houses the fuel cell stack, a temperature detector that detects a first temperature, the first temperature is a temperature of the fuel cell stack or inside the casing, and a controller. The controller controls based on the first temperature so as to allow an operation at a first predetermined temperature. The controller controls such that the first temperature reaches a temperature higher than or equal to a second predetermined temperature for a predetermined time. The second predetermined temperature is a temperature at which 475° C. embrittlement that occurs on stainless steel is eliminated. The first predetermined temperature is lower than the second predetermined temperature.

It should be noted that general or specific embodiments may be implemented as a system, an apparatus, a method, an integrated circuit, a computer program, a non-transitory computer-readable storage medium such as a CD-ROM, or any selective combination thereof.

According to one aspect of the present disclosure, stainless steel members constituting a fuel cell system or an electrochemical system can be prevented from being broken because of the influence of 475° C. embrittlement.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
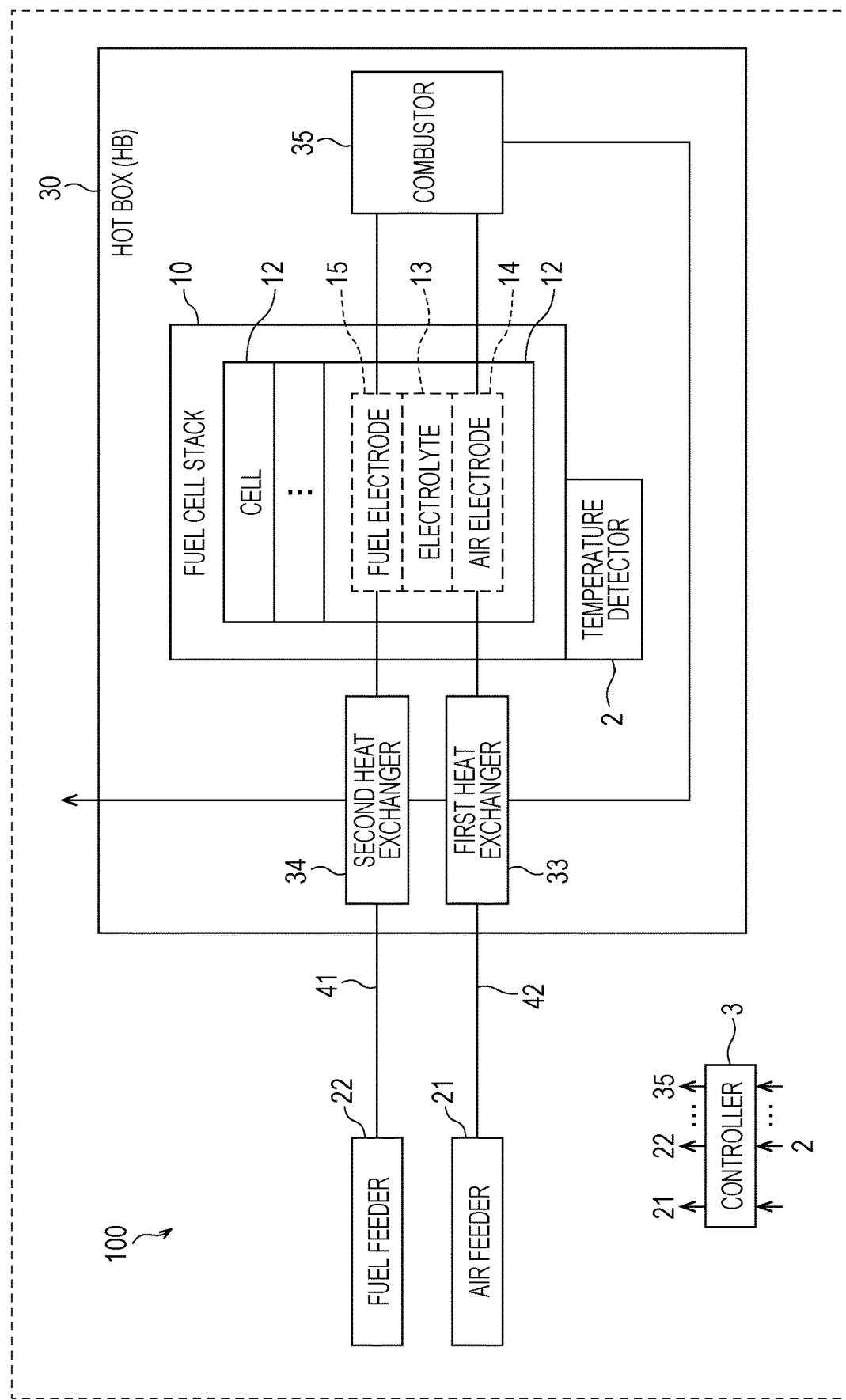
FIG. 1 is a block diagram schematically illustrating an example of the configuration of a fuel cell system according to a first embodiment of the present disclosure.

Studies that have led to embodiments of the present disclosure

In recent years, fuel cells that operate in a temperature range of about 500° C. have been proposed. Such fuel cells are, for example, low-temperature operating solid oxide fuel cells (SOFCs). The constituted members of such fuel cells that operate in a temperature range of about 500° C. are normally formed of a ferrite stainless steel, which is provided at low cost and has high corrosion resistance, high heat resistance, and high workability.

When the constituted members of fuel cell systems that operate in a temperature range of about 500° C. are formed of a ferrite stainless steel used in typical fuel cell systems, the constituted members are exposed to a temperature of about 500° C. for a long time during power generation of the fuel cell systems and thus subjected to 475° C. embrittlement. As a result of 475° C. embrittlement, the constituted members may be broken through vibration from the outside.

In the ferrite stainless steel for separators of solid oxide fuel cells disclosed in Patent Document 1, it is proposed that the composition of the ferrite stainless steel be defined and the stainless steel be mechanically polished so as to have a mechanically polished surface having a surface roughness Ra of 0.05 to 50 µm as defined in JIS B0601.

However, as a result of thorough studies conducted on the ferrite stainless steel disclosed in Patent Document 1, the present inventors have found that in order to impart corrosion resistance and oxidation resistance, other components need to be added and also surface polishing or the like needs to be performed, which increases the cost.

They have also noticed that when surface polishing is performed, the surface is altered as a result of long-time operation of fuel cell systems and thus embrittlement resistance cannot be maintained.

Accordingly, the present inventors have found that 475° C. embrittlement can be eliminated by improving the operation control of fuel cell systems without adding other components or performing surface polishing or the like to impart corrosion resistance and oxidation resistance unlike the ferrite stainless steel disclosed in Patent Document 1.

The above findings of the present inventors have not been obvious so far and have novel technical features that produce remarkable advantages. The present disclosure specifically provides the following aspects.

A fuel cell system according to a first aspect of the present disclosure discloses a fuel cell system includes a fuel cell stack constituted by cells, each of the cells includes a fuel electrode, an air electrode, and an electrolyte, and generate electric power through a reaction of a fuel gas and air, a casing that houses the fuel cell stack, a temperature detector that detects a first temperature, the first temperature is a temperature of the fuel cell stack or inside the casing, and a controller. The controller controls based on the first temperature so as to allow an operation at a first predetermined temperature. The controller controls such that the first temperature reaches a temperature higher than or equal to a second predetermined temperature for a predetermined time. The second predetermined temperature is a temperature at which 475° C. embrittlement that occurs on stainless steel is eliminated. The first predetermined temperature is lower than the second predetermined temperature.

When a fuel gas feeder feeds hydrogen as a fuel gas, the fuel gas is directly fed to the fuel electrode. When a fuel gas feeder feeds a raw material gas such as a hydrocarbon fuel as a fuel gas, the fuel gas is fed to the fuel electrode after being reformed.

In the above configuration, the controller can maintain a state in which the temperature of the fuel cell stack is increased to a temperature higher than or equal to the second predetermined temperature for a predetermined time.

Therefore, even when the first predetermined temperature is a temperature (e.g., about 500° C.) at which 475° C. embrittlement of stainless steel occurs during power generation of the fuel cell stack and at which a Fe-rich Fe—Cr phase and a Cr-rich Fe—Cr phase are generated in a ferrite phase through spinodal decomposition and the latter Cr-rich Fe—Cr phase hardens and becomes brittle and thus stainless steel members constituting the fuel cell system are subjected to 475° C. embrittlement through generation of the Cr-rich Fe—Cr phase, the Cr-rich Fe—Cr phase can be eliminated through transition to a phase before 475° C. embrittlement in which uneven distribution of Fe and Cr is suppressed.

Accordingly, in the fuel cell system according to the first aspect of the present disclosure, stainless steel members constituting the fuel cell system can be prevented from being broken because of the influence of 475° C. embrittlement.

A fuel cell system in a second aspect according to the first aspect of the present disclosure may further include a fuel feeder that feeds the fuel gas to the fuel electrode and an air feeder that feeds an oxidant gas to the air electrode, wherein the controller may control at least one of an amount of the fuel gas fed by the fuel feeder and an amount of the oxidant gas fed by the air feeder such that the first temperature detected by the temperature detector reaches a temperature higher than or equal to the second predetermined temperature.

In this configuration, the controller controls at least one of an amount of the fuel gas fed by the fuel feeder and an amount of the oxidant gas fed by the air feeder such that the temperature detected by the temperature detector reaches a temperature higher than or equal to the second predetermined temperature. Thus, stainless steel members constituting the fuel cell system can be prevented from being broken because of the influence of 475° C. embrittlement.

In a fuel cell system in a third aspect according to the first or second aspect of the present disclosure, the fuel cell stack, the casing that houses the fuel cell stack, and at least one of members disposed in the casing together with the fuel cell stack may be formed of stainless steel.

In the above configuration, since some of members constituting the fuel cell system are stainless steel members, the durability and the reliability can be improved with improvements in corrosion resistance, heat resistance, and workability.

A fuel cell system in a fourth aspect according to the second or third aspect of the present disclosure may include at least one of a combustor in which an anode off-gas discharged from the fuel electrode of the cells and a cathode off-gas discharged from the air electrode are burned and a combustion space having a combustion function, wherein the controller may control an amount of the fuel gas fed by the fuel feeder such that a temperature of the fuel cell stack reaches a temperature higher than or equal to the second predetermined temperature for the predetermined time.

In the above configuration, the controller performs control such that the amount of fuel gas fed is increased. This increases the amount of combustion in the combustor or the combustion space, thereby increasing the temperature of the fuel cell stack.

Therefore, the fuel cell system according to the fourth aspect can appropriately control the temperature of the fuel cell stack to a temperature higher than or equal to the second predetermined temperature for the predetermined time.

In a fuel cell system in a fifth aspect according to the second or third aspect of the present disclosure, the controller may control an amount of the oxidant gas fed by the air feeder such that a temperature of the fuel cell stack reaches a temperature higher than or equal to the second predetermined temperature for the predetermined time.

In this configuration, the controller performs control such that the amount of oxidant gas fed is decreased. This decreases the amount of cooling with the oxidant gas, thereby increasing the temperature of the fuel cell stack.

Therefore, the fuel cell system according to the fifth aspect can appropriately control the temperature of the fuel cell stack to a temperature higher than or equal to the second predetermined temperature for the predetermined time.

In a fuel cell system in a sixth aspect according to any one of the first to fifth aspects of the present disclosure, the second predetermined temperature may be 590° C. or higher.

In a fuel cell system in a seventh aspect according to any one of the first to sixth aspects of the present disclosure, the predetermined time may be 1 minute to 60 minutes.

In this configuration, the predetermined time is set to 1 minute to 60 minutes. Therefore, even if 475° C. embrittlement is caused through generation of a Cr-rich Fe—Cr phase in the stainless steel members, the Cr-rich Fe—Cr phase can be eliminated through transition to a phase before 475° C. embrittlement in which uneven distribution of Fe and Cr is suppressed.

In a fuel cell system in an eighth aspect according to any one of the second to seventh aspects of the present disclosure, the controller may control at least one of an amount of the fuel gas fed by the fuel feeder and an amount of the oxidant gas fed by the air feeder during power generation such that a temperature of the fuel cell stack periodically reaches, at particular intervals, a temperature higher than or equal to the second predetermined temperature for the predetermined time.

In this configuration, the controller can perform control during power generation such that the temperature of the fuel cell stack periodically reaches, at particular intervals, a temperature higher than or equal to the second predetermined temperature for the predetermined time. Therefore, even if 475° C. embrittlement is caused through generation of a Cr-rich Fe—Cr phase in the stainless steel members as a result of long-time operation during power generation, the Cr-rich Fe—Cr phase can be eliminated through transition to a phase before 475° C. embrittlement in which uneven distribution of Fe and Cr is suppressed.

In a fuel cell system in a ninth aspect according to any one of the first to eighth aspects of the present disclosure, the electrolyte in the cells constituting the fuel cell stack may be a proton conductor.

In this configuration, since the fuel cell stack is constituted by cells including a proton-conductive electrolyte, the operating temperature during power generation is about 500° C. Therefore, stainless steel members subjected to 475° C. embrittlement may be present.

However, the controller can control at least one of the amount of fuel gas fed by the fuel feeder and the amount of oxidant gas fed by the air feeder such that the temperature of the fuel cell stack reaches a temperature higher than or equal to the second predetermined temperature for the predetermined time. Therefore, even if 475° C. embrittlement is caused through generation of a Cr-rich Fe—Cr phase in the stainless steel members, the Cr-rich Fe—Cr phase can be eliminated through transition to a phase before the 475° C. embrittlement in which uneven distribution of Fe and Cr is suppressed.

In a fuel cell system in a tenth aspect according to any one of the first to ninth aspects of the present disclosure, the electrolyte may be formed of $Ba_xZr_yM_zO_{3-\sigma}$, where M is at least one element selected from the group consisting of Sc, In, Lu, Yb, Tm, Er, Y, Ho, Dy, and Gd and $0.9 \leq x \leq 1.0$, $0.6 \leq y \leq 0.90$, $0.1 \leq z \leq 0.4$, and $2.70 \leq 3-\sigma \leq 2.95$ are satisfied.

In this configuration, since the electrolyte in the fuel cell stack is formed of $Ba_xZr_yM_zO_{3-\sigma}$, where M is at least one element selected from the group consisting of Sc, In, Lu, Yb, Tm, Er, Y, Ho, Dy, and Gd and $0.9 \leq x \leq 1.0$, $0.6 \leq y \leq 0.90$, $0.1 \leq z \leq 0.4$, and $2.70 \leq 3-\sigma \leq 2.95$ are satisfied, the operating temperature during power generation is about 500° C. Therefore, stainless steel members subjected to 475° C. embrittlement may be present.

However, the controller can control at least one of the amount of fuel gas fed by the fuel feeder and the amount of oxidant gas fed by the air feeder such that the temperature of the fuel cell stack reaches a temperature higher than or equal to the second predetermined temperature for the predetermined time. Therefore, even if 475° C. embrittlement is caused through generation of a Cr-rich Fe—Cr phase in the stainless steel members, the Cr-rich Fe—Cr phase can be eliminated through transition to a phase before the 475° C. embrittlement in which uneven distribution of Fe and Cr is suppressed.

In a fuel cell system in an eleventh aspect according to any one of the first to ninth aspects of the present disclosure, the fuel cell stack may be constituted by cells including a metal support.

In this configuration, since the fuel cell stack is constituted by cells including a metal support, the operating temperature during power generation is about 500° C. Therefore, stainless steel members subjected to 475° C. embrittlement may be present.

However, the controller can control at least one of the amount of fuel gas fed by the fuel feeder and the amount of oxidant gas fed by the air feeder such that the temperature of the fuel cell stack reaches a temperature higher than or equal to the second predetermined temperature for the predetermined time. Therefore, even if 475° C. embrittlement is caused through generation of a Cr-rich Fe—Cr phase in the stainless steel members, the Cr-rich Fe—Cr phase can be eliminated through transition to a phase before the 475° C. embrittlement in which uneven distribution of Fe and Cr is suppressed.

A method for operating a fuel cell system according to a twelfth aspect of the present disclosure, the fuel cell system including a fuel cell stack constituted by a plurality of cells, each of the cells includes a fuel electrode, an air electrode, and an electrolyte and generate electric power through a reaction of a fuel gas and air, a casing that houses the fuel cell stack, and a temperature detector that detects a first temperature, the first temperature is a temperature of the fuel cell stack or a temperature inside the casing, includes controlling based on the first temperature so as to allow an operation at a first predetermined temperature; and controlling such that the first temperature reaches a temperature higher than or equal to a second predetermined temperature for a predetermined time, wherein the second predetermined temperature is a temperature at which 475° C. embrittlement that occurs on stainless steel is eliminated, and the first predetermined temperature is lower than the second predetermined temperature.

In the above method, a state in which the temperature of the fuel cell stack is increased to a temperature higher than or equal to the second predetermined temperature for a predetermined time can be maintained.

Therefore, even when the first predetermined temperature during power generation of the fuel cell stack is a temperature (e.g., about 500° C.) at which 475° C. embrittlement of stainless steel occurs and at which a Fe-rich Fe—Cr phase and a Cr-rich Fe—Cr phase are generated in a ferrite phase through spinodal decomposition and the latter Cr-rich Fe—Cr phase hardens and becomes brittle and thus stainless steel members constituting the fuel cell system are subjected to 475° C. embrittlement through generation of the Cr-rich Fe—Cr phase, the Cr-rich Fe—Cr phase can be eliminated through transition to a phase before 475° C. embrittlement in which uneven distribution of Fe and Cr is suppressed.

Accordingly, in the method for operating a fuel cell system according to the twelfth aspect of the present disclosure, stainless steel members constituting the fuel cell system can be prevented from being broken because of the influence of 475° C. embrittlement.

An electrochemical system according to a thirteenth aspect of the present disclosure includes an electrochemical stack constituted by a plurality of cells, each of the cells includes a fuel electrode, an air electrode, and an electrolyte and generate electric power through a reaction of a fuel gas and air; a casing that houses the electrochemical stack; a temperature detector that detects a first temperature, the first temperature is a temperature of the electrochemical stack or a temperature inside the casing; and a controller, wherein the controller performs control based on the first temperature so as to allow an operation at a first predetermined temperature, the controls control such that the first temperature reaches a temperature higher than or equal to a second predetermined temperature for a predetermined time, the second predetermined temperature is a temperature at which 475° C. embrittlement that occurs on stainless steel is eliminated, and the first predetermined temperature is lower than the second predetermined temperature.

In the above method, a state in which the temperature of the electrochemical stack is increased to a temperature higher than or equal to the second predetermined temperature for a predetermined time can be maintained.

Therefore, even when the first predetermined temperature during the operation of the electrochemical stack is a temperature (e.g., about 500° C.) at which 475° C. embrittlement of stainless steel occurs and at which a Fe-rich Fe—Cr phase and a Cr-rich Fe—Cr phase are generated in a ferrite phase through spinodal decomposition and the latter Cr-rich Fe—Cr phase hardens and becomes brittle and thus stainless steel members constituting the electrochemical system are subjected to 475° C. embrittlement through generation of the Cr-rich Fe—Cr phase, the Cr-rich Fe—Cr phase can be eliminated through transition to a phase before 475° C. embrittlement in which uneven distribution of Fe and Cr is suppressed.

Accordingly, in the electrochemical system according to the thirteenth aspect of the present disclosure, stainless steel members constituting the electrochemical system can be prevented from being broken because of the influence of 475° C. embrittlement.

Hereafter, embodiments of the present disclosure will be described with reference to the attached drawings. The embodiments that will be described below are examples of the above aspects. Therefore, the shapes, the materials, the constituent elements, the arrangement and connection modes of constituent elements, and the like described below are merely illustrative and do not limit the above aspects unless they are described in the claims. Among constituent elements below, constituent elements that are not described in independent claims expressing the broadest concept according to each of the above aspects will be described as optional constituent elements. In the drawings, the description of elements having the same reference numeral may be omitted. The drawings schematically illustrate each constituent element to facilitate the understanding. Therefore, for example, the shapes and the dimensional ratios are sometimes different from actual ones.

First Embodiment

Configuration of Fuel Cell System

The configuration of a fuel cell system 100 according to a first embodiment of the present disclosure will be described with reference to FIG. 1. FIG. 1 is a block diagram schematically illustrating an example of the configuration of the fuel cell system 100 according to the first embodiment of the present disclosure. The fuel cell system 100 will be described using, as an example, a solid oxide fuel cell (SOFC) that operates and generates electric power in a temperature range of about 500° C. However, the fuel cell system 100 is not limited to the SOFC as long as a fuel cell that operates and generates electric power in a temperature range of about 500° C. is employed.

As illustrated in FIG. 1, the fuel cell system 100 according to the first embodiment of the present disclosure includes cells 12 that each include a fuel electrode 15, an air electrode 14, and an electrolyte 13 and generate electric power through a reaction of a fuel gas (hydrogen) and an oxidant gas (oxygen), a fuel cell stack 10 constituted by a plurality of cells 12, a fuel feeder (fuel gas feeder) 22 that feeds the fuel gas to the fuel electrode 15, an air feeder (oxidant gas feeder) 21 that feeds the oxidant gas to the air electrode 14, a temperature detector 2 that detects the temperature of the fuel cell stack 10, and a controller 3.

As illustrated in FIG. 1, in the fuel cell system 100, constituted members such as the fuel cell stack 10, a first heat exchanger 33, a second heat exchanger 34, a combustor 35, and the temperature detector 2 are housed in a casing (hot box 30) and arranged at their predetermined positions. A combustion space having a combustion function may be included instead of the combustor 35, or both the combustor 35 and the combustion space may be employed.

In the fuel cell system 100, the constituted members such as the fuel cell stack 10, the first heat exchanger 33, the second heat exchanger 34, and the combustor 35 and at least one member in the hot box 30 are formed of stainless steel. The stainless steel used herein may be a ferrite stainless steel typically used in fuel cell systems.

The temperature of each of the constituted members such as the fuel cell stack 10, the first heat exchanger 33, the second heat exchanger 34, and the combustor 35 housed in the hot box 30 can be regarded as substantially the same temperature as the fuel cell stack 10.

The fuel feeder 22 feeds a fuel gas such as hydrogen to the fuel electrode 15 of the cell 12 through a fuel gas feed path 41. The air feeder 21 feeds an oxidant gas such as air to the air electrode 14 of the cell 12 through an oxidant gas feed path 42. In the cell 12, electric power is generated through an electrochemical reaction of the fuel gas fed to the fuel electrode 15 and the oxidant gas fed to the air electrode 14.

In the fuel cell system 100, an anode off-gas discharged from the fuel electrode 15 of the cell 12 and a cathode off-gas discharged from the air electrode 14 are burned in the combustor 35. With the heat of a combustion exhaust gas generated through combustion in the combustor 35, the first heat exchanger 33 preheats the oxidant gas fed to the cell 12 while the second heat exchanger 34 preheats the fuel gas (hydrogen) fed to the cell 12.

The fuel cell system 100 according to the first embodiment of the present disclosure may further include a water feeder (not illustrated) that feeds humidifying water for humidifying the fuel gas (hydrogen) fed to the fuel electrode 15 and a power generation output detector (not illustrated) that detects the power generation output (hereafter simply referred to as an output) from the voltage and current of the fuel cell stack 10 or the fuel cell system 100.

The fuel cell stack 10 may be constituted by cells 12 that generate electric power in a temperature range of about 500° C. and each include a proton-conductive electrolyte 13. Alternatively, the fuel cell stack 10 may be constituted by cells 12 each including, below the fuel electrode 15 (on the side opposite to the side in contact with the electrolyte 13), a metal support formed of, for example, a porous metal and a layer having fuel-permeable pores.

The controller 3 controls each unit included in the fuel cell system 100 and includes a computing unit (not illustrated) such as a CPU and a memory unit (not illustrated) such as a ROM or a RAM. The memory unit stores information such as basic programs for the fuel cell system 100 and fixed data. The computing unit reads and executes the basic programs and the like. Thus, the controller 3 controls the operation of each unit. The controller 3 may be constituted by a single controller for centralized control or a plurality of controllers that work together for distributed control.

Figure 2:
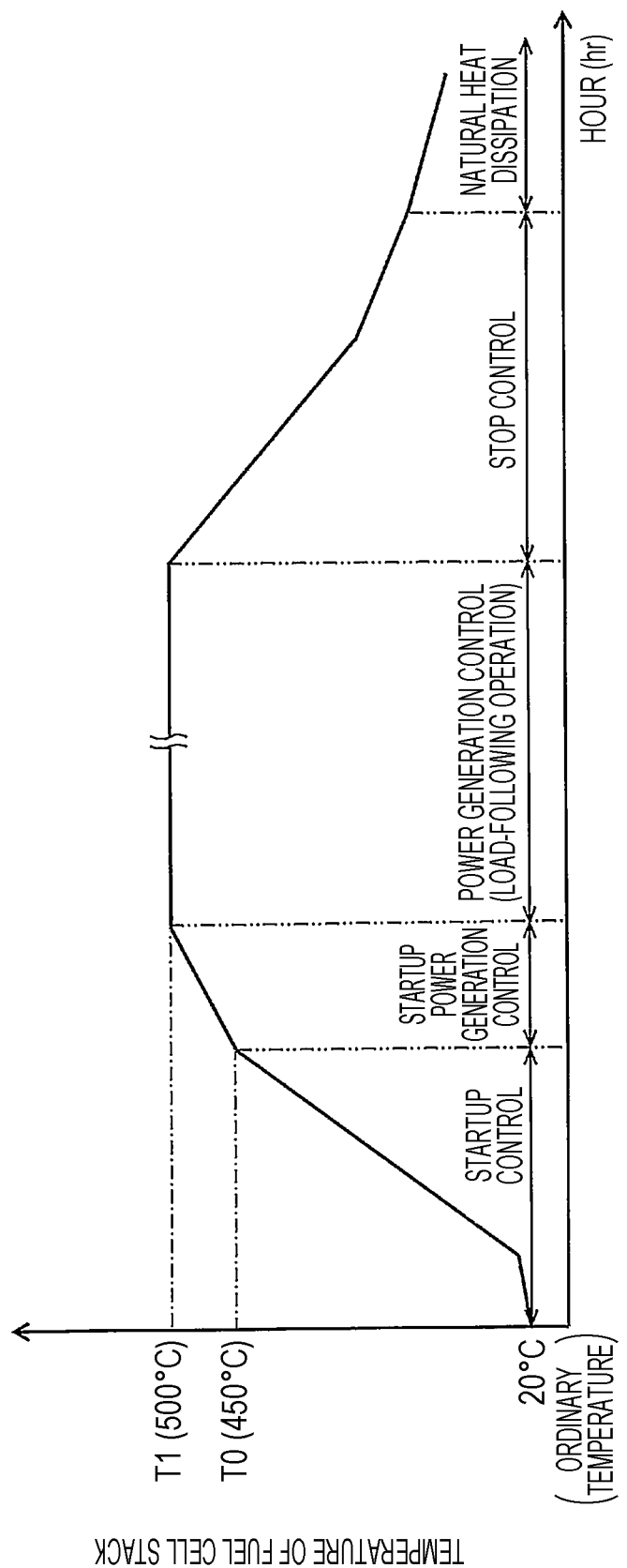
FIG. 2 illustrates an example of a change in temperature of a fuel cell stack with the operation control of a fuel cell system in a comparative example of the present disclosure.

In typical fuel cell systems, the operation control is performed from the startup through power generation to the stop on the basis of control instructions given by the controller 3. With this operation control, the temperature of the fuel cell stack changes as illustrated in FIG. 2. FIG. 2 illustrates an example of a change in temperature of a fuel cell stack with the operation control of a fuel cell system in a comparative example of the present disclosure.

In the fuel cell system 100 according to the first embodiment of the present disclosure, if a 475° C. embrittlement elimination control described later is not performed, the operation control is also performed from the startup through power generation to the stop on the basis of control instructions given by the controller 3. Consequently, the temperature of the fuel cell stack 10 changes as illustrated in FIG. 2.

That is, as illustrated in FIG. 2, when the fuel cell system 100 generates electric power in accordance with the target power generation load, the temperature of the fuel cell stack 10 is increased from ordinary temperature (about 20° C.) to a temperature at which electric power can be stably generated (stable power generation temperature T1 (first predetermined temperature); 400° C. to 575° C., preferably 500° C.) while startup control and startup power generation control are performed. FIG. 2 illustrates the case where the fuel cell system 100 generates electric power at the rated load for convenience of description. The power generation load varies in accordance with the target amount of power generation.

In the fuel cell system 100, the controller 3 controls the fuel feeder 22 to introduce a fuel gas (hydrogen) into the fuel electrode 15 of the cell 12 during the startup control. The controller 3 also controls the air feeder 21 to introduce an oxidant gas into the air electrode 14 of the cell 12.

In the fuel cell system 100, the controller 3 controls the combustor 35 to burn an anode off-gas discharged from the fuel electrode 15 of the cell 12 together with a cathode off-gas discharged from the air electrode 14 of the cell 12. The heat of combustion and the heat of a combustion exhaust gas increase the temperature of the fuel cell stack 10 from ordinary temperature. Thus, the startup control is performed in the fuel cell system 100.

When the controller 3 determines, on the basis of detection results given by the temperature detector 2, that the temperature of the fuel cell stack 10 has reached a predetermined temperature T0 (e.g., T0=450° C.) that is lower than the stable power generation temperature T1, the controller 3 controls a switch (not illustrated) or the like to close a power generation circuit including the fuel cell stack 10. Thus, the fuel cell stack 10 starts to generate electric power to allow an electric current to flow through the power generation circuit. As a result of this power generation, the fuel cell stack 10 itself generates heat, which quickly increases the temperature of the fuel cell stack 10 (startup power generation control).

That is, as illustrated in FIG. 2, the startup power generation control is performed after the startup control and until the temperature of the fuel cell stack 10 reaches the stable power generation temperature T1 at which power generation can be performed such that electric power is stably supplied in accordance with the target power generation load. In the fuel cell system 100, when the controller 3 determines, on the basis of detection results given by the temperature detector 2, that the temperature of the fuel cell stack 10 has reached the stable power generation temperature T1 (about 500° C.), the startup power generation control is switched to power generation control (load-following operation).

Then, when stop of the power generation control is instructed, the fuel cell system 100 is subjected to stop control (control for stopping the power generation control). Specifically, the controller 3 controls the switch (not illustrated) to open the power generation circuit, thereby stopping the power generation control in the fuel cell stack 10. The controller 3 respectively controls the fuel feeder 22 and the air feeder 21 such that the flow rates of the fuel gas (hydrogen) and oxidant gas fed to the fuel cell stack 10 are changed to flow rates for stopping power generation.

After the stop of the power generation control, the fuel gas (hydrogen) and the oxidant gas are continuously fed to the cell 12. Therefore, the combustion of the anode off-gas and the cathode off-gas in the combustor 35 is continued. However, since the flow rate of the oxidant gas fed is sufficiently high, heat is dissipated from the fuel cell stack 10, which gradually decreases the temperature of the fuel cell stack 10. When the controller 3 determines, on the basis of detection results given by the temperature detector 2, that the temperature of the fuel cell stack 10 has decreased to a predetermined temperature, the controller 3 controls the fuel feeder 22 to stop the feed of the fuel gas (hydrogen) to the fuel electrode 15 and also controls the air feeder 21 to stop the feed of the oxidant gas to the air electrode 14. The temperature of the fuel cell stack 10 is decreased through natural heat dissipation.

As illustrated in FIG. 2, the fuel cell system 100 is operated for a long time in a temperature range (e.g., 400° C. to 550° C.) in which the temperature of the fuel cell stack 10 is close to the stable power generation temperature T1. If the operation time is long in a temperature range near the stable power generation temperature T1, the ferrite stainless steel that is a material for the constituted members such as the fuel cell stack 10 and the hot box 30 housing the constituted members hardens and 475° C. embrittlement proceeds.

As a result of proceeding of 475° C. embrittlement, the members formed of a ferrite stainless steel become brittle. If such a fuel cell system is employed as a portable system installed in automobiles and the like, the fuel cell system may be damaged by vibrations during the travel. If such a fuel cell system is employed as a stationary system, the fuel cell system may be damaged by vibrations due to, for example, earthquakes and typhoons. Therefore, the fuel cell system 100 is controlled such that the temperature of the fuel cell stack 10 is increased once from the stable power generation temperature T1 to a temperature higher than or equal to a predetermined temperature T2 (second predetermined temperature) (T2 =590° C. or higher, preferably 600° C.), kept for a predetermined time time1 (time1=1 minute to 60 minutes, preferably 30 minutes to 60 minutes), and then decreased to the stable power generation temperature T1 again (475° C. embrittlement elimination control).

The predetermined time time1 is a time required to eliminate the 475° C. embrittlement of the ferrite stainless steel and is set to 1 minute or more and preferably 30 minutes or more. In the case where the fuel cell stack 10 is kept at the predetermined temperature T2 by increasing the amount of fuel gas fed, the loss of the fuel gas (hydrogen) increases as the time for which the predetermined temperature T2 is kept increases. From the viewpoint of reducing the loss of the fuel gas (hydrogen), the predetermined time time1 is suitably set to 60 minutes or less.

By performing the 475° C. embrittlement elimination control in the fuel cell system 100, even if 475° C. embrittlement is caused through generation of a Cr-rich Fe—Cr phase in the ferrite stainless steel, the Cr-rich Fe—Cr phase can be eliminated through transition to a phase before 475° C. embrittlement in which uneven distribution of Fe and Cr is suppressed.

Hereafter, the 475° C. embrittlement elimination control performed in the fuel cell system 100 will be described with reference to FIG. 3 to FIG. 6.

Figure 3:
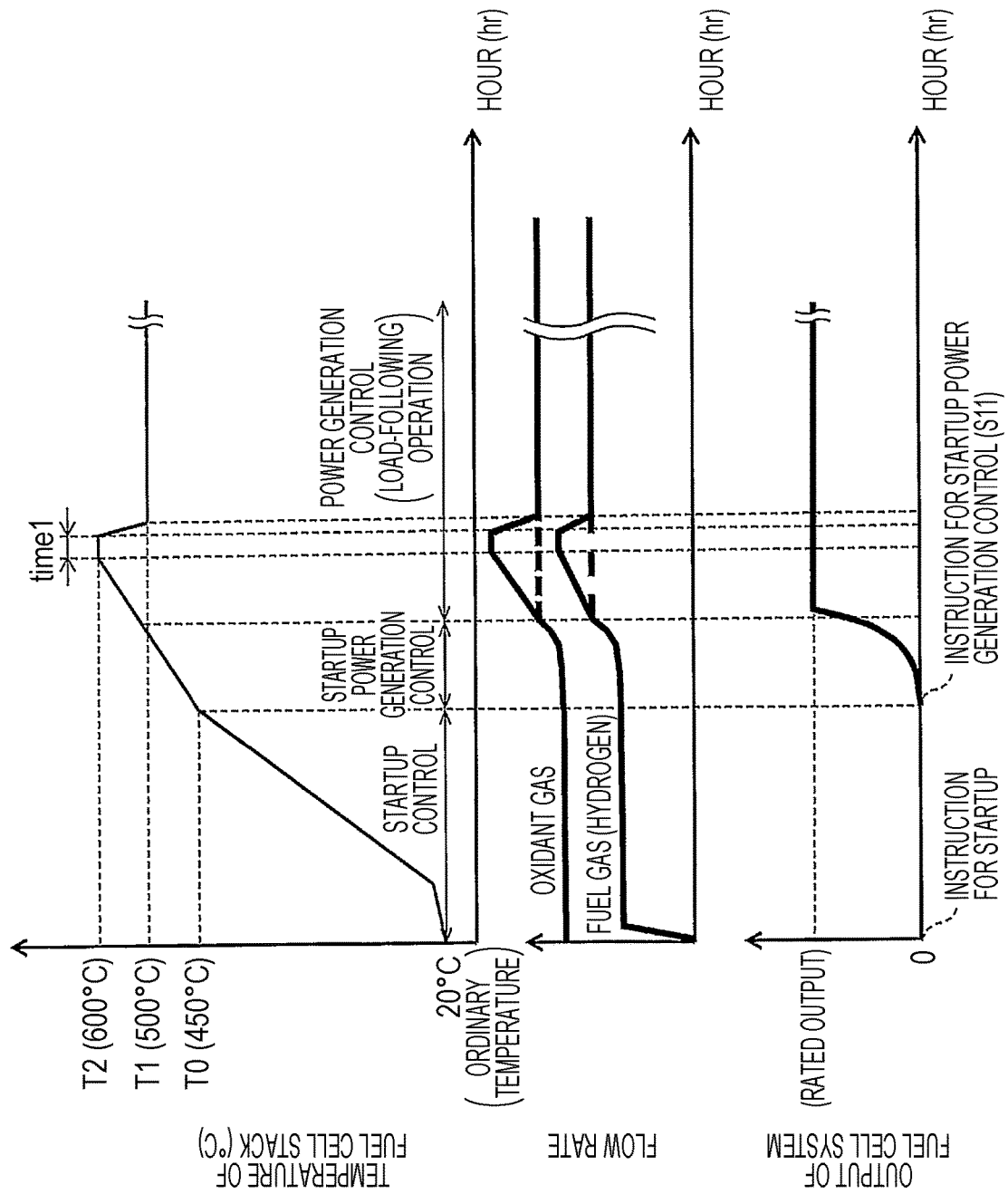
FIG. 3 illustrates the relationship between a change in the temperature of a fuel cell stack, changes in the flow rates of a fuel gas (hydrogen) and an oxidant gas fed, and a change in power generation output in the 475° C. embrittlement elimination control during startup according to the first embodiment of the present disclosure.
Figure 4:
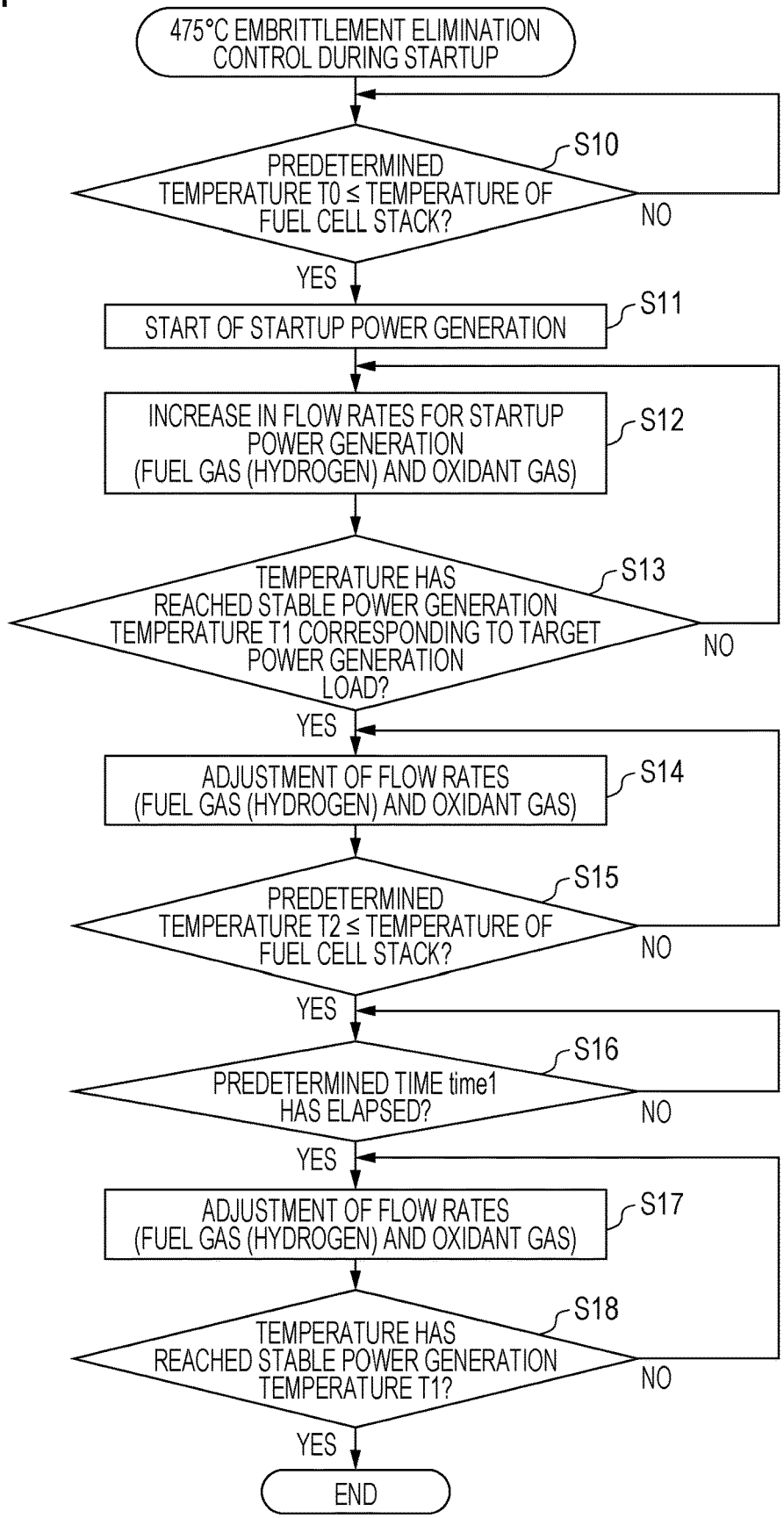
FIG. 4 is a flowchart illustrating an example of the 475° C. embrittlement elimination control during startup according to the first embodiment of the present disclosure.
Figure 5:
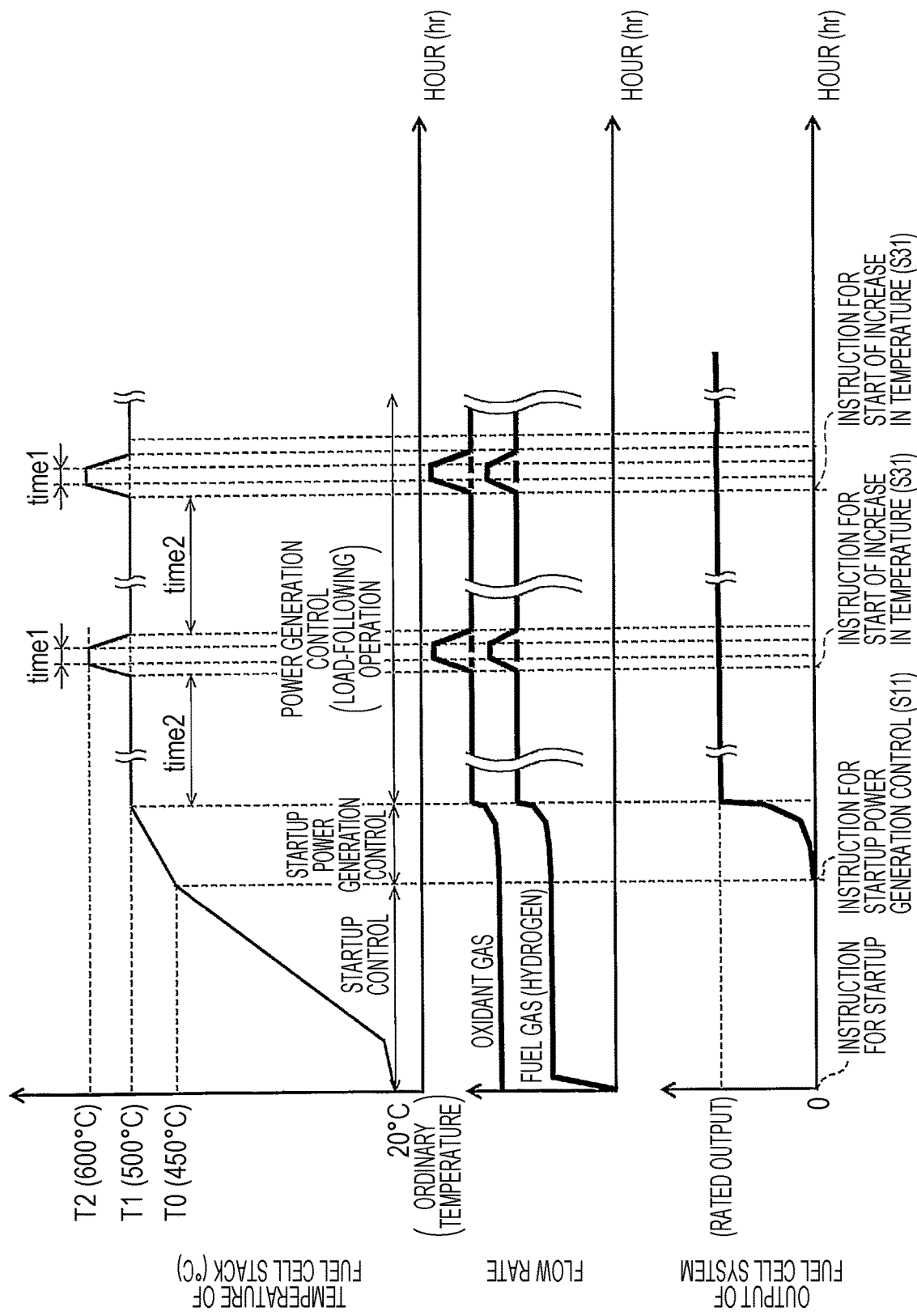
FIG. 5 illustrates the relationship between a change in the temperature of a fuel cell stack, changes in the flow rates of a fuel gas (hydrogen) and an oxidant gas fed, and a change in power generation output in the 475° C. embrittlement elimination control during power generation according to the first embodiment of the present disclosure.
Figure 6:
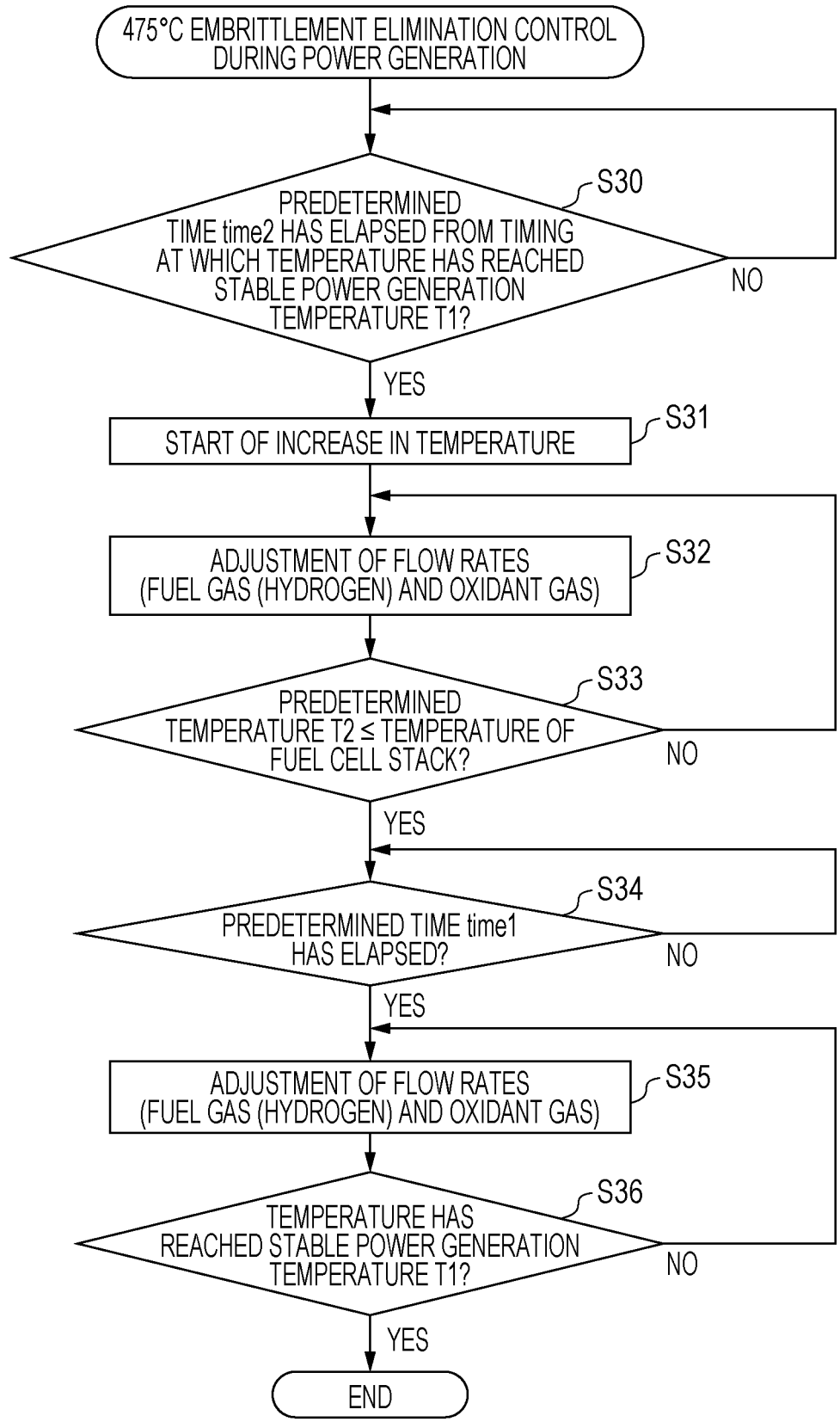
FIG. 6 is a flowchart illustrating an example of the 475° C. embrittlement elimination control during power generation according to the first embodiment of the present disclosure.

FIG. 3 illustrates the relationship between a change in the temperature of the fuel cell stack 10, changes in the flow rates of the fuel gas (hydrogen) and oxidant gas fed, and a change in power generation output in the 475° C. embrittlement elimination control during startup according to the first embodiment of the present disclosure. FIG. 4 is a flowchart illustrating an example of the 475° C. embrittlement elimination control during startup according to the first embodiment of the present disclosure. FIG. 5 illustrates the relationship between a change in the temperature of the fuel cell stack 10, changes in the flow rates of the fuel gas (hydrogen) and oxidant gas fed, and a change in power generation output in the 475° C. embrittlement elimination control during power generation according to the first embodiment of the present disclosure. FIG. 6 is a flowchart illustrating an example of the 475° C. embrittlement elimination control during power generation according to the first embodiment of the present disclosure.

In FIG. 3 and FIG. 5, the time-series changes in the flow rates of the oxidant gas and fuel gas (hydrogen) fed in the fuel cell system 100 in which the 475° C. embrittlement elimination control is performed are indicated by solid lines. The time-series changes in the flow rates of the oxidant gas and fuel gas (hydrogen) fed during normal power generation in which the 475° C. embrittlement elimination control is not performed are indicated by broken lines. 475° C. embrittlement elimination control during startup Hereafter, the 475° C. embrittlement elimination control during startup according to the first embodiment of the present disclosure will be described with reference to FIG. 3 and FIG. 4.

In the fuel cell system 100, when the controller 3 receives an instruction for startup, the controller 3 controls the air feeder 21 such that the air feeder 21 starts to feed an oxidant gas and also controls the fuel feeder 22 such that the fuel feeder 22 starts to feed a fuel gas (hydrogen). The oxidant gas may be fed to the fuel cell system 100 before the controller 3 receives an instruction for startup to purge the oxidant gas feed path 42. In the fuel cell system 100, the temperature of the fuel cell stack 10 is increased by burning a cathode off-gas and an anode off-gas in the combustor 35, thereby performing the startup control.

During the startup control, the controller 3 determines, on the basis of detection results given by the temperature detector 2, whether the temperature of the fuel cell stack 10 has reached a temperature higher than or equal to the predetermined temperature T0 (e.g., T0=450° C.) (Step S10). While the controller 3 determines that the temperature of the fuel cell stack 10 is lower than the predetermined temperature T0 ("NO" in Step S10), the determination whether the temperature of the fuel cell stack 10 has reached a temperature higher than or equal to the predetermined temperature T0 is repeated.

On the other hand, when the controller 3 determines, on the basis of detection results given by the temperature detector 2, that the temperature of the fuel cell stack 10 has reached a temperature higher than or equal to the predetermined temperature T0, the controller 3 instructs a start of the startup power generation control (Step S11). Specifically, the controller 3 controls the switch (not illustrated) or the like to close the power generation circuit and start the startup power generation control.

When the start of the startup power generation control is instructed, the controller 3 respectively controls the air feeder 21 and the fuel feeder 22 such that the flow rates of the oxidant gas and fuel gas (hydrogen) fed are increased to flow rates for startup power generation (Step S12). The controller 3 determines, on the basis of detection results given by the temperature detector 2, whether the temperature of the fuel cell stack 10 has reached a stable power generation temperature T1 at which an electric power (output) (e.g., rated output 700 W) corresponding to the target power generation load can be supplied (Step S13).

In Step S13, while the controller 3 determines that the temperature of the fuel cell stack 10 does not reach the stable power generation temperature T1 ("NO" in Step S13), the controller 3 controls the air feeder 21 and the fuel feeder 22 to continuously increase the flow rates of the fuel gas (hydrogen) and oxidant gas fed, respectively.

On the other hand, in Step S13, when the controller 3 determines that the temperature of the fuel cell stack 10 has reached the stable power generation temperature T1 ("YES" in Step S13), the controller 3 controls the air feeder 21 and the fuel feeder 22 to adjust the flow rates of the oxidant gas and fuel gas (hydrogen) fed, respectively, such that the temperature of the fuel cell stack 10 increases to a temperature higher than or equal to the predetermined temperature T2 (T2=590° C. or higher, preferably 600° C.) (Step S14). For example, the amount of combustion in the combustor 35 in which the anode off-gas and cathode off-gas discharged from the cell 12 are burned is increased by further increasing the flow rates of the oxidant gas and fuel gas (hydrogen) fed, thereby increasing the temperature of the fuel cell stack 10. That is, the flow rate of the fuel gas (hydrogen) fed is increased while at the same time the flow rate of the oxidant gas fed is increased to maintain the air-fuel ratio in the combustor 35 disposed downstream of the fuel cell stack 10.

The controller 3 determines, on the basis of detection results given by the temperature detector 2, whether the temperature of the fuel cell stack 10 has reached a temperature higher than or equal to the predetermined temperature T2 (Step S15). While the controller 3 determines that the temperature of the fuel cell stack 10 is lower than the predetermined temperature T2 ("NO" in Step S15), the controller 3 controls the air feeder 21 and the fuel feeder 22 to continuously increase the flow rates of the oxidant gas and fuel gas (hydrogen) fed, respectively.

On the other hand, when the controller 3 determines, on the basis of detection results given by the temperature detector 2, that the temperature of the fuel cell stack 10 has reached a temperature higher than or equal to the predetermined temperature T2 ("YES" in Step S15), the controller 3 controls the air feeder 21 and the fuel feeder 22 to maintain the flow rates of the oxidant gas and fuel gas (hydrogen) fed, respectively. By maintaining the flow rates, the fuel cell stack 10 is kept at the predetermined temperature T2.

However, the response of the increase in temperature may be delayed because of the heat capacity of the fuel cell stack 10. Therefore, if the flow rates set when the temperature reaches a temperature higher than or equal to the predetermined temperature T2 are maintained, the temperature is excessively increased in many cases. Therefore, after the temperature reaches a temperature higher than or equal to the predetermined temperature T2, the flow rates may be slightly changed to maintain the predetermined temperature T2, thereby preventing an excessive increase in temperature.

In the fuel cell stack 10, a temperature distribution is generated during operation. Since the temperature detector 2 gives the representative temperature of the fuel cell stack 10, the predetermined temperature T2 may be set using data obtained in advance such that the 475° C. embrittlement elimination control also effectively works in the lowest-temperature portion of the fuel cell stack 10.

For example, the temperature data given by the temperature detector 2 when the lowest temperature of the fuel cell stack 10 (the temperature of the lowest-temperature portion of the fuel cell stack 10) is 600° C. is obtained in advance. In this data obtained in advance, for example, when the temperature detected by the temperature detector 2 when the lowest temperature of the fuel cell stack 10 is 600° C. is 650° C., the predetermined temperature T2 may be set to 650° C.

Furthermore, the controller 3 operates a timer (not illustrated) to measure the elapsed time from the timing at which the temperature of the fuel cell stack 10 has been determined to reach a temperature higher than or equal to the predetermined temperature T2. The controller 3 determines whether the predetermined time time1 has elapsed while the temperature of the fuel cell stack 10 is the predetermined temperature T2 (Step S16). The predetermined time time1 can be set to, for example, 1 minute to 60 minutes and preferably 30 minutes to 60 minutes.

As described above, in the fuel cell system 100, after the temperature of the fuel cell stack 10 reaches a stable power generation temperature T1 of about 500° C., the temperature can be further increased to the predetermined temperature T2. Therefore, even if 475° C. embrittlement is caused through generation of a Cr-rich Fe—Cr phase in the members formed of a ferrite stainless steel, the Cr-rich Fe—Cr phase can be eliminated through transition to a phase before 475° C. embrittlement in which uneven distribution of Fe and Cr is suppressed.

When the controller 3 determines that the predetermined time time1 has not been elapsed while the temperature of the fuel cell stack 10 is the predetermined temperature T2 ("NO" in Step S16), the controller 3 continues the determination whether the predetermined time time1 has elapsed on the basis of measurement results given by the timer. On the other hand, when the controller 3 determines that the predetermined time time1 has elapsed while the temperature of the fuel cell stack 10 is the predetermined temperature T2 ("YES" in Step S16), the controller 3 controls the air feeder 21 and the fuel feeder 22 to adjust the flow rates of the oxidant gas and fuel gas (hydrogen) fed, respectively (Step S17).

The controller 3 determines, on the basis of detection results given by the temperature detector 2, whether the temperature of the fuel cell stack 10 has reached the stable power generation temperature T1 (Step S18). While the controller 3 determines that the temperature of the fuel cell stack 10 has not reached the stable power generation temperature T1 ("NO" in Step S18), for example, the controller 3 repeats the determination whether the temperature of the fuel cell stack 10 has reached the stable power generation temperature T1 while decreasing the flow rates of the oxidant gas and fuel gas fed.

On the other hand, when the controller 3 determines that the temperature of the fuel cell stack 10 has reached the stable power generation temperature T1 ("YES" in Step S18), the controller 3 executes, for example, a normal power generation control illustrated in FIG. 2.

When the memory unit stores in advance information concerning the relationship between the temperature of the fuel cell stack 10 and the output of the fuel cell stack 10, in Steps S13 and S18, the controller 3 may determine, on the basis of the output of the fuel cell stack 10 (detection results given by a power generation output detector (not illustrated)), whether the temperature of the fuel cell stack 10 has reached the stable power generation temperature T1.

In Step S13, when the controller 3 determines that the temperature of the fuel cell stack 10 has reached the stable power generation temperature T1, the flow rates of the fuel gas (hydrogen) and oxidant gas fed are increased such that the temperature of the fuel cell stack 10 reaches a temperature higher than or equal to the predetermined temperature T2. However, Step S13 is not limited to this configuration.

The controller 3 may control the fuel feeder 22 to increase only the flow rate of the fuel gas (hydrogen) fed. In this case, the amount of combustion in the combustor 35 in which the anode off-gas and cathode off-gas discharged from the cell 12 are burned is increased by further increasing the flow rate of the fuel gas (hydrogen) fed, thereby increasing the temperature of the fuel cell stack 10. Alternatively, the controller 3 may control the air feeder 21 such that the flow rate of the oxidant gas fed is decreased. In this case, the temperature drop of the fuel cell stack 10 due to the oxidant gas can be suppressed by decreasing the amount of oxidant gas fed to the fuel cell stack 10, thereby increasing the temperature of the fuel cell stack 10.

In the case where the controller 3 controls the fuel feeder 22 to increase only the flow rate of the fuel gas (hydrogen) fed, the controller 3 controls the fuel feeder 22 to decrease only the flow rate of the fuel gas (hydrogen) fed in Step S17. In the case where the controller 3 controls the air feeder 21 to decrease only the flow rate of the oxidant gas fed, the controller 3 controls the air feeder 21 to increase only the flow rate of the oxidant gas (air) fed in Step S17.

As described above, in the fuel cell system 100 according to the first embodiment of the present disclosure, the 475° C. embrittlement elimination control during startup is performed after startup power generation and before power generation is performed such that an output corresponding to the target power generation load is supplied. Therefore, in the fuel cell system 100, the members formed of a ferrite stainless steel in the fuel cell system 100 can be prevented from being broken because of the influence of 475° C. embrittlement after the controller 3 receives an instruction for startup and before the power generation control is performed.

In the fuel cell system 100, the members formed of a ferrite stainless steel are affected by the 475° C. embrittlement not only during the startup but also during the power generation control. In other words, when the power generation control is continuously performed in the fuel cell system 100 in a temperature range of about 500° C., the members formed of a ferrite stainless steel may be affected by the 475° C. embrittlement and may become brittle. Therefore, the 475° C. embrittlement elimination control may be periodically performed at particular intervals during the power generation control of the fuel cell system 100. 475° C. embrittlement elimination control during power generation Hereafter, the 475° C. embrittlement elimination control during power generation periodically performed at particular intervals during the power generation control will be described with reference to FIG. 5 and FIG. 6.

During the power generation control in the fuel cell system 100, the controller 3 operates a timer (not illustrated) to measure the elapsed time from the last timing at which the temperature of the fuel cell stack 10 has reached the stable power generation temperature T1. The controller 3 determines, on the basis of measurement results given by the timer, whether the predetermined time time2 has elapsed from the timing at which the temperature of the fuel cell stack 10 has reached the stable power generation temperature T1 (Step S30). The predetermined time time2 may be, for example, 24 hours or more and 10000 hours or less, preferably 100 hours or more and 5000 hours or less, and more preferably about 168 hours such that the 475° C. embrittlement elimination control can be performed about once a week. The predetermined time time2 is suitably selected from the time period for which the power generation control during which the 475° C. embrittlement possibly occurs is performed in the members formed of a stainless steel.

While the controller 3 determines that the predetermined time time2 has not elapsed from the timing at which the temperature of the fuel cell stack 10 has reached the stable power generation temperature T1 ("NO" in Step S30), the controller 3 repeats the determination process in Step S30. On the other hand, when the controller 3 determines, on the basis of measurement results given by the timer, that the predetermined time time2 has elapsed from the timing at which the temperature of the fuel cell stack 10 has reached the stable power generation temperature T1 ("YES" in Step S30), the controller 3 instructs a start of an increase in temperature of the fuel cell system 100 (Step S31). The controller 3 controls the air feeder 21 and the fuel feeder 22 to adjust the flow rates of the oxidant gas and fuel gas (hydrogen) fed, respectively (Step S32). The following processes (processes from Step S33 to Step S36) are the same as the processes from Step S15 to Step S18 of the 475° C. embrittlement elimination control during startup in FIG. 4, and thus the description thereof is omitted.

In Step S36, when the controller 3 determines that the temperature of the fuel cell stack 10 has reached the stable power generation temperature T1 and executes a normal power generation control, the controller 3 resets, to zero, a counter of the timer used to determine whether the predetermined time time2 has elapsed. The elapsed time from the timing at which the temperature of the fuel cell stack 10 has reached the stable power generation temperature T1 is measured again. After the 475° C. embrittlement elimination control during power generation is performed and then the predetermined time time2 has elapsed from the timing at which the temperature of the fuel cell stack 10 has reached the stable power generation temperature T1, the 475° C. embrittlement elimination control during power generation is performed again.

When the memory unit stores in advance information concerning the relationship between the temperature of the fuel cell stack 10 and the output of the fuel cell stack 10, in Step S36, the controller 3 may determine, on the basis of the output of the fuel cell stack 10 (detection results given by a power generation output detector (not illustrated)), whether the temperature of the fuel cell stack 10 has reached the stable power generation temperature T1.

In Step S31, after the controller 3 instructs a start of an increase in temperature, the flow rates of the fuel gas (hydrogen) and oxidant gas fed are increased such that the temperature of the fuel cell stack 10 reaches a temperature higher than or equal to the predetermined temperature T2. However, Step S31 is not limited to this configuration.

The controller 3 may control the fuel feeder 22 to increase only the flow rate of the fuel gas (hydrogen) fed. In this case, the amount of combustion in the combustor 35 in which the anode off-gas and cathode off-gas discharged from the cell 12 are burned is increased by further increasing the flow rate of the fuel gas (hydrogen) fed, thereby increasing the temperature of the fuel cell stack 10. Alternatively, the controller 3 may control the air feeder 21 such that the flow rate of the oxidant gas fed is decreased. In this case, the temperature drop of the fuel cell stack 10 due to the oxidant gas can be suppressed by decreasing the amount of oxidant gas fed to the fuel cell stack 10, thereby increasing the temperature of the fuel cell stack 10.

In the case where the controller 3 controls the fuel feeder 22 to increase only the flow rate of the fuel gas (hydrogen) fed, the controller 3 controls the fuel feeder 22 to decrease only the flow rate of the fuel gas (hydrogen) fed in Step S35. In the case where the controller 3 controls the air feeder 21 to decrease only the flow rate of the oxidant gas fed, the controller 3 controls the air feeder 21 to increase only the flow rate of the oxidant gas (air) fed in Step S35.

As described above, in the fuel cell system 100 according to the first embodiment of the present disclosure, the 475° C. embrittlement elimination control can be periodically performed at particular intervals (predetermined time time2) during the power generation control from the timing at which electric power corresponding to the target power generation load can be generated in the fuel cell system 100 (e.g., the timing at which the temperature of the fuel cell stack 10 has reached the stable power generation temperature T1). Therefore, even if the 475° C. embrittlement is caused through generation of a Cr-rich Fe—Cr phase in the members formed of a ferrite stainless steel during the power generation control in the fuel cell system 100, the Cr-rich Fe—Cr phase can be eliminated through transition to a phase before 475° C. embrittlement in which uneven distribution of Fe and Cr is suppressed. Accordingly, the stainless steel members in the fuel cell system 100 can be prevented from being broken because of the influence of 475° C. embrittlement.

Second Embodiment

Figure 7:
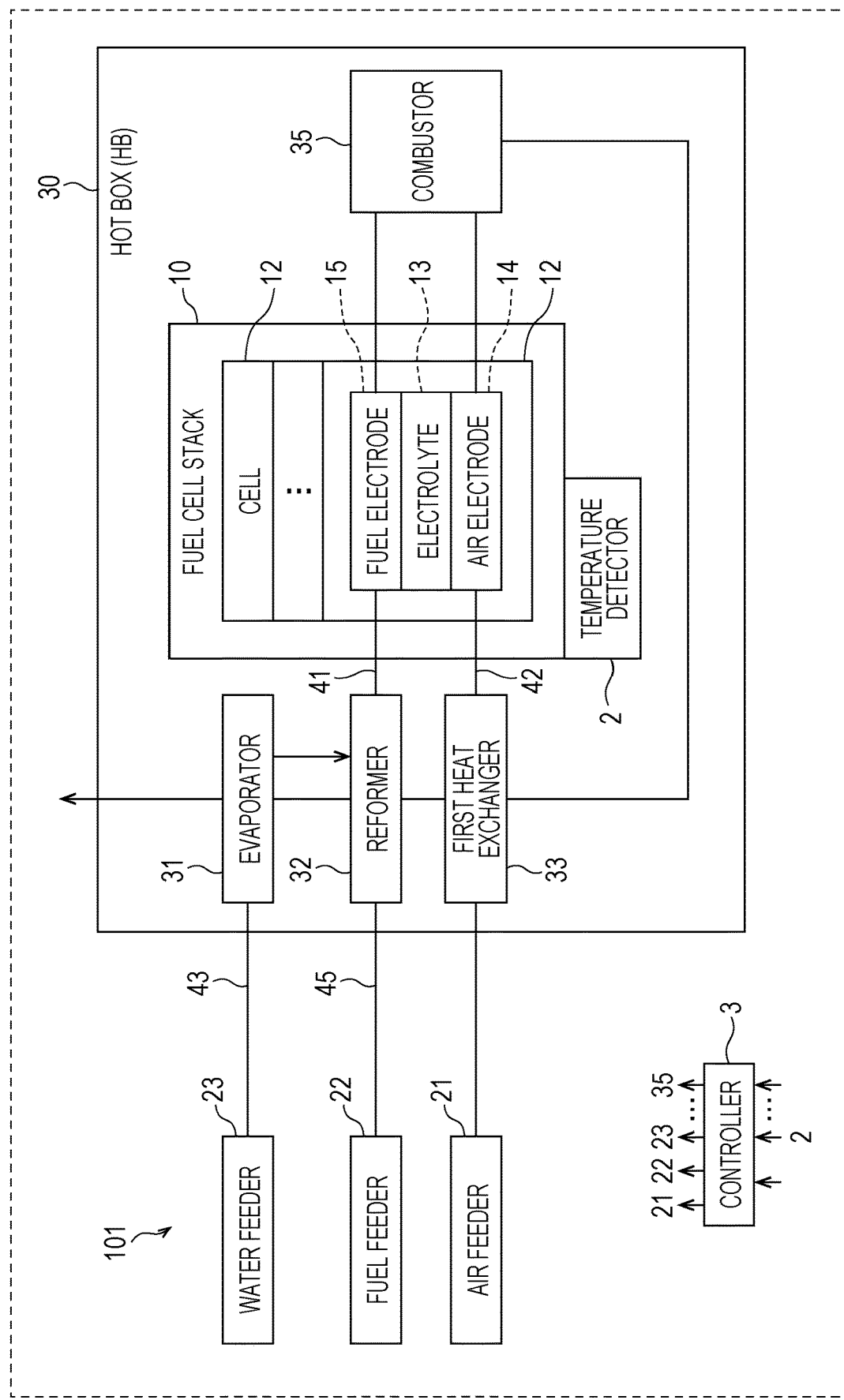
FIG. 7 is a block diagram schematically illustrating an example of the configuration of a fuel cell system according to a second embodiment of the present disclosure.

Next, the configuration of a fuel cell system 101 according to a second embodiment of the present disclosure will be described with reference to FIG. 7. FIG. 7 is a block diagram schematically illustrating an example of the configuration of the fuel cell system 101 according to the second embodiment of the present disclosure.

In the fuel cell system 100 according to the first embodiment of the present disclosure, hydrogen serving as a fuel gas is fed to the fuel electrode 15 by the fuel feeder 22. In the fuel cell system 101 according to the second embodiment of the present disclosure, a raw material gas such as a hydrocarbon fuel, e.g., city gas or LPG, is fed as a fuel gas to a reformer 32 by the fuel feeder 22, and a reformed gas obtained by reforming the raw material gas in the reformer 32 is fed to the fuel electrode 15.

Specifically, as illustrated in FIG. 7, the fuel cell system 101 further includes a water feeder 23, an evaporator 31, and a reformer 32 in addition to the configuration of the fuel cell system 100. The evaporator 31 and the reformer 32 are disposed in the hot box 30. In the fuel cell system 101, the reformed gas fed to the cell 12 can be preheated in the reformer 32, and thus the second heat exchanger 34 included in the fuel cell system 100 is not necessarily disposed. Except for this, the fuel cell system 101 has the same configuration as the fuel cell system 100. Therefore, the same members are designated by the same symbols and the description thereof is omitted.

In the fuel cell system 101, the raw material gas is fed to the reformer 32 through a raw material gas feed path 45 by the fuel feeder 22. Furthermore, reforming water is fed to the reformer 32 through a water feed path 43 by the water feeder 23. The evaporator 31 is disposed in the water feed path 43, and the reforming water fed from the water feeder 23 is vaporized and fed to the reformer 32.

A heat source required to perform a reforming reaction in the reformer 32 and a heat source required to vaporize the reforming water in the evaporator 31 are heat of a combustion exhaust gas generated in the combustor 35. That is, the combustion exhaust gas generated in the combustor 35 is passed through the first heat exchanger 33, the reformer 32, and the evaporator 31 and discharged to the outside of the hot box 30.

When the combustion exhaust gas is passed through the first heat exchanger 33, an oxidant gas is preheated by using a part of heat of the combustion exhaust gas, and the combustion exhaust gas is fed to the reformer 32. In the reformer 32, a part of heat of the combustion exhaust gas is used to cause a reforming reaction (steam reforming reaction) to proceed. Then, the combustion exhaust gas is fed to the evaporator 31, and a part of heat of the combustion exhaust gas is used to vaporize the reforming water. As described above, heat of the combustion exhaust gas is used in each of the first heat exchanger 33, the reformer 32, and the evaporator 31. The combustion exhaust gas is discharged to the outside of the hot box 30, with the temperature being sufficiently decreased.

In the fuel cell system 101 having the above configuration, if a 475° C. embrittlement elimination control described later is not performed, the operation control is performed from the startup through power generation to the stop on the basis of control instructions given by the controller 3 as in the case of the fuel cell system 100 as illustrated in FIG. 2.

That is, in the fuel cell system 101, the controller 3 controls the fuel feeder 22 to feed a raw material gas to the reformer 32 during the startup control. The raw material gas fed to the reformer 32 is fed to the fuel electrode 15 of the cell 12. The controller 3 also controls the air feeder 21 to feed an oxidant gas to the air electrode 14 of the cell 12 in the fuel cell stack 10.

In the fuel cell system 101, the controller 3 controls the combustor 35 to burn an anode off-gas discharged from the fuel electrode 15 of the cell 12 together with a cathode off-gas discharged from the air electrode 14 of the cell 12. The heat of combustion in the combustor 35 and the heat of a combustion exhaust gas increase the temperature of the fuel cell stack 10. By using heat of the combustion exhaust gas, the oxidant gas is heated in the first heat exchanger 33 while at the same time the reformer 32 and the evaporator 31 are heated so as to each have a predetermined temperature. After the reformer 32 and the evaporator 31 are each heated to the predetermined temperature, the controller 3 controls the water feeder 23 to guide reforming water to the evaporator 31 and vaporize the reforming water in the evaporator 31. A mixed gas prepared by mixing the raw material gas and steam obtained through vaporization in the evaporator 31 is fed to the reformer 32.

After the reformer 32 is heated to the predetermined temperature, a mixed gas of the raw material gas and the steam is fed to the reformer 32 to reform the raw material gas through a steam reforming reaction (SR) in the reformer 32. This steam reforming reaction (SR) is an endothermic reaction. However, since the ambient temperature of the reformer 32 is sufficiently high at this point of time, the temperature of the fuel cell stack 10 can be stably increased. Thus, the startup control is performed in the fuel cell system 101.

When the controller 3 determines, on the basis of detection results given by the temperature detector 2, that the temperature of the fuel cell stack 10 has reached a predetermined temperature T0 (e.g., 450° C.) that is lower than a temperature at which electric power is stably generated, the controller 3 controls a switch (not illustrated) or the like to close a power generation circuit including the fuel cell stack 10. Thus, the fuel cell stack 10 starts to generate electric power to allow an electric current to flow through the power generation circuit. As a result of this power generation, an exothermic reaction is caused and the fuel cell stack 10 itself generates heat, which quickly increases the temperature of the fuel cell stack 10 (startup power generation control).

That is, as illustrated in FIG. 2, the startup power generation control is performed after the startup control and until the temperature of the fuel cell stack 10 reaches the stable power generation temperature T1 (e.g., 500° C.). In the fuel cell system 101, when the controller 3 determines, on the basis of detection results given by the temperature detector 2, that the temperature has reached the stable power generation temperature T1 (about 500° C.), the power generation control (load-following operation) is started.

Then, when stop of the power generation control is instructed, the fuel cell system 101 is subjected to stop control. Specifically, the controller 3 controls the switch (not illustrated) to open the power generation circuit, thereby stopping power generation in the fuel cell stack 10. The controller 3 respectively controls the fuel feeder 22, the water feeder 23, and the air feeder 21 such that the flow rates of the raw material gas and reforming water fed to the reformer 32 and the flow rate of the oxidant gas fed to the fuel cell stack 10 are changed to flow rates for stopping power generation.

Since the raw material gas and the reforming water are continuously fed, combustion is continued in the combustor 35. However, the flow rate of the oxidant gas fed is sufficiently high and thus heat is radiated, which gradually decreases the temperature of the fuel cell stack 10. When the controller 3 determines, on the basis of detection results given by the temperature detector 2, that the temperature of the fuel cell stack 10 has decreased to a predetermined temperature, the controller 3 controls the fuel feeder 22 and the water feeder 23 to stop the feed of the raw material gas and reforming water fed to the reformer 32 and also controls the air feeder 21 to stop the feed of the oxidant gas to the air electrode 14. The temperature of the fuel cell stack 10 is decreased through natural heat dissipation.

As in the case of the fuel cell system 100, the fuel cell system 101 is controlled such that the temperature of the fuel cell stack 10 is increased once from the stable power generation temperature T1 (e.g., 500° C.) to the predetermined temperature T2 (e.g., 600° C.), kept for a predetermined time (time1=1 minute to 60 minutes, preferably 30 minutes to 60 minutes), and then decreased to stable power generation temperature T1 again (475° C. embrittlement elimination control). By performing the 475° C. embrittlement elimination control in the fuel cell system 101, even if 475° C. embrittlement is caused through generation of a Cr-rich Fe—Cr phase in the ferrite stainless steel, the Cr-rich Fe—Cr phase can be eliminated through transition to a phase before 475° C. embrittlement in which uneven distribution of Fe and Cr is suppressed.

Hereafter, the 475° C. embrittlement elimination control performed in the fuel cell system 101 will be described with reference to FIG. 8 to FIG. 11.

Figure 8:
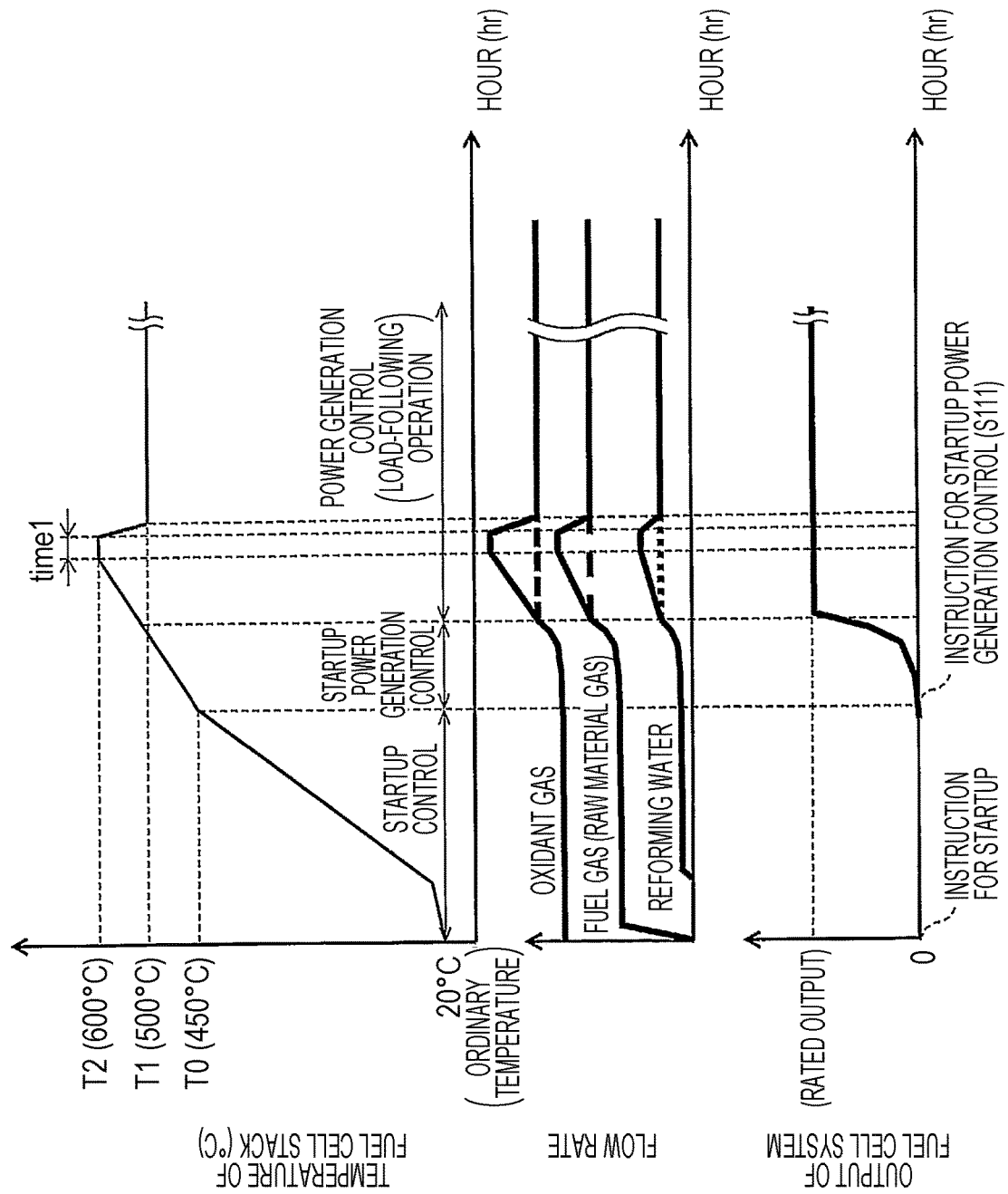
FIG. 8 illustrates the relationship between a change in the temperature of a fuel cell stack, changes in the flow rates of the reforming water, raw material gas, and oxidant gas fed, and a change in power generation output in the 475° C. embrittlement elimination control during startup according to the second embodiment of the present disclosure.
Figure 9:
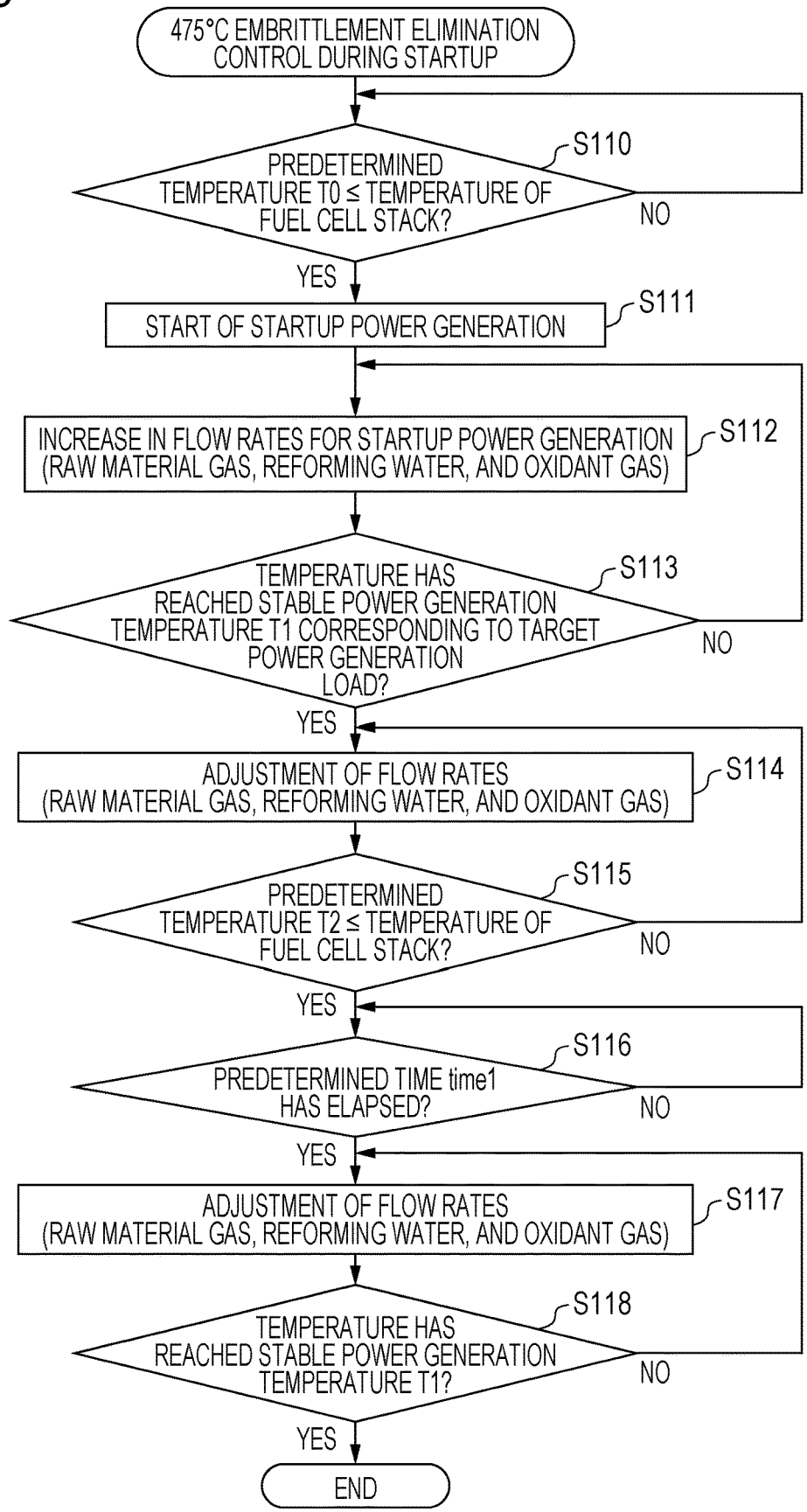
FIG. 9 is a flowchart illustrating an example of the 475° C. embrittlement elimination control during startup according to the second embodiment of the present disclosure.
Figure 10:
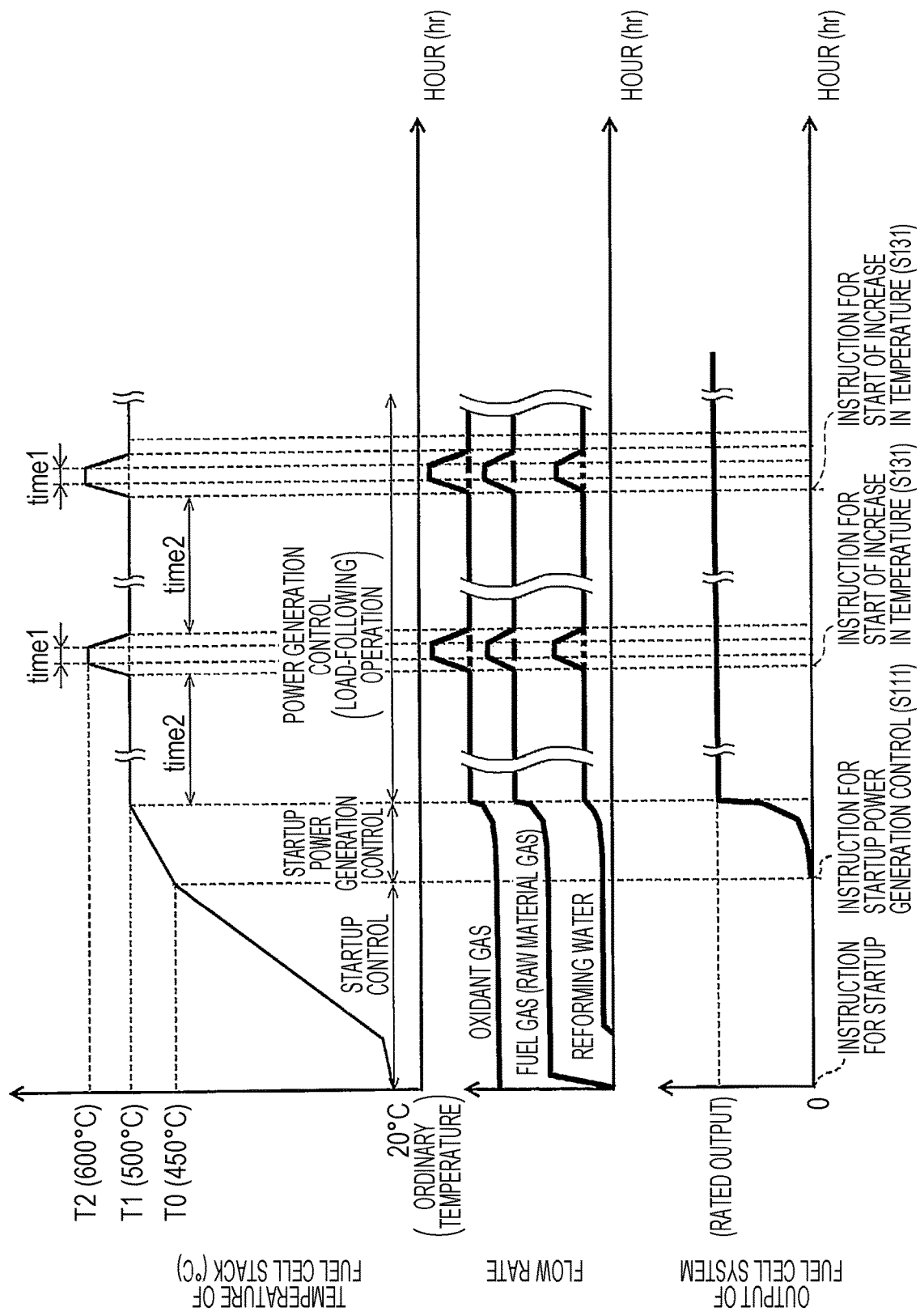
FIG. 10 illustrates the relationship between a change in the temperature of a fuel cell stack, changes in the flow rates of the reforming water, raw material gas, and oxidant gas fed, and a change in power generation output in the 475° C. embrittlement elimination control during power generation according to the second embodiment of the present disclosure.
Figure 11:
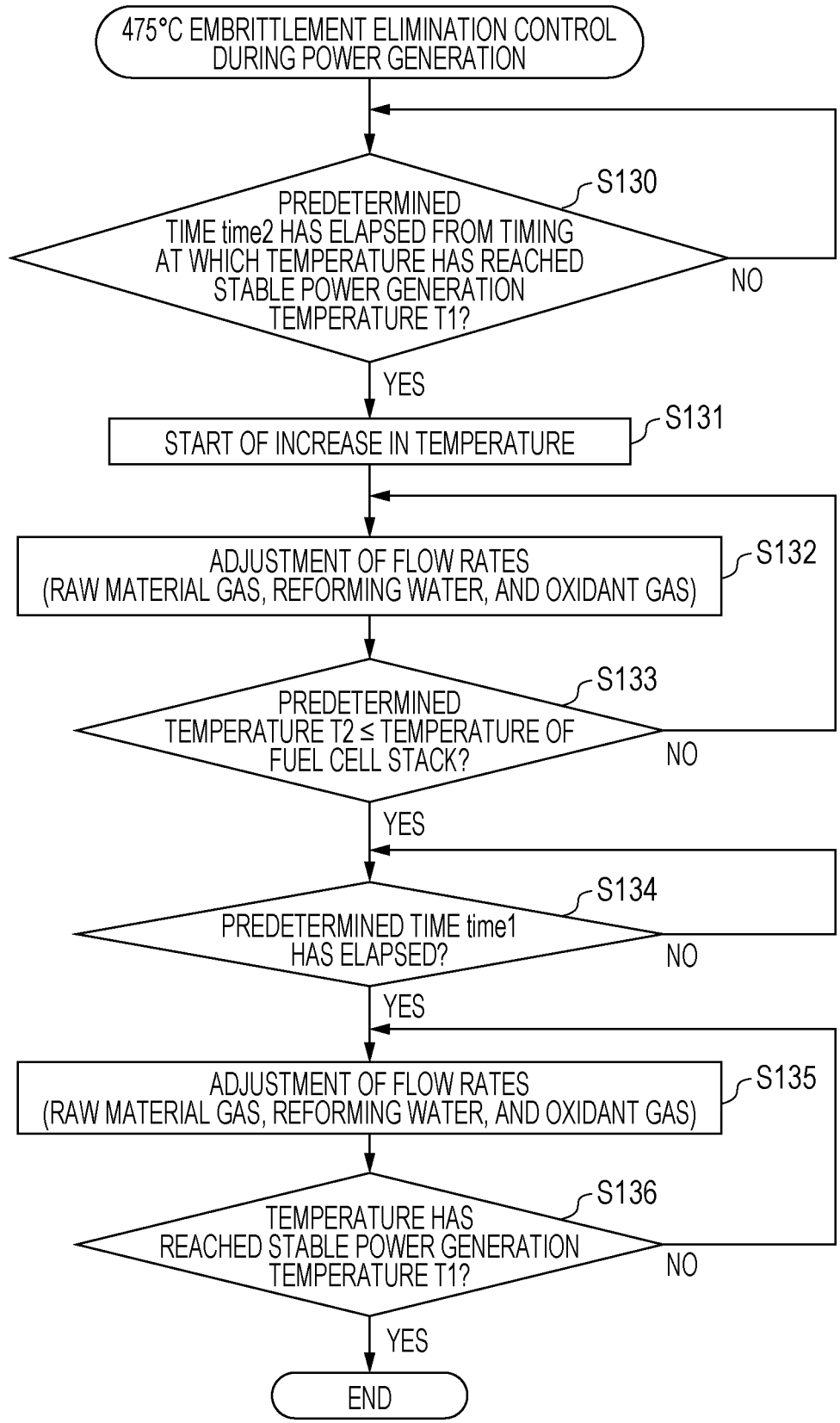
FIG. 11 is a flowchart illustrating an example of the 475° C. embrittlement elimination control during power generation according to the second embodiment of the present disclosure.

FIG. 8 illustrates the relationship between a change in the temperature of the fuel cell stack 10, changes in the flow rates of the reforming water, raw material gas, and oxidant gas fed, and a change in power generation output in the 475° C. embrittlement elimination control during startup according to the second embodiment of the present disclosure. FIG. 9 is a flowchart illustrating an example of the 475° C. embrittlement elimination control during startup according to the second embodiment of the present disclosure. FIG. 10 illustrates the relationship between a change in the temperature of the fuel cell stack 10, changes in the flow rates of the reforming water, raw material gas, and oxidant gas fed, and a change in power generation output in the 475° C. embrittlement elimination control during power generation according to the second embodiment of the present disclosure. FIG. 11 is a flowchart illustrating an example of the 475° C. embrittlement elimination control during power generation according to the second embodiment of the present disclosure.

In FIG. 8 and FIG. 10, the changes in the flow rates of the oxidant gas, raw material gas, and reforming water fed in the fuel cell system 101 in which the 475° C. embrittlement elimination control is performed are indicated by solid lines. The changes in the flow rates of the oxidant gas, raw material gas, and reforming water fed during the normal operation in which the 475° C. embrittlement elimination control is not performed are indicated by broken lines. 475° C. embrittlement elimination control during startup Hereafter, the 475° C. embrittlement elimination control during startup according to the second embodiment of the present disclosure will be described with reference to FIG. 8 and FIG. 9.

In the fuel cell system 101, when the controller 3 receives an instruction for startup, the controller 3 controls the air feeder 21 such that the air feeder 21 starts to feed an oxidant gas to the cell 12 and also controls the fuel feeder 22 such that the fuel feeder 22 starts to feed a raw material gas to the reformer 32. The raw material gas fed to the reformer 32 is fed to the cell 12 through the reformer 32. A cathode off-gas and an anode off-gas discharged from the cell 12 are burned in the combustor 35, thereby increasing the temperature of the fuel cell stack 10.

Then, when the temperatures of the fuel cell stack 10, the reformer 32, and the evaporator 31 are increased to the predetermined temperature, the controller 3 controls the water feeder 23 such that the water feeder 23 starts to feed reforming water. The reforming water is vaporized in the evaporator 31 and fed to the reformer 32 together with the raw material gas. When the vaporized reforming water is fed to the reformer 32, a reformed gas is generated through a steam reforming reaction in the reformer 32 and fed to the cell 12. In the fuel cell system 101, the temperature of the fuel cell stack 10 is increased by burning a cathode off-gas and an anode off-gas in the combustor 35, thereby performing the startup control.

During the startup control, the controller 3 determines, on the basis of detection results given by the temperature detector 2, whether the temperature of the fuel cell stack 10 has reached a temperature higher than or equal to the predetermined temperature T0 (e.g., T0=450° C.) (Step S110). While the controller 3 determines that the temperature of the fuel cell stack 10 does not reach a temperature higher than or equal to the predetermined temperature T0 ("NO" in Step S110), the determination whether the temperature of the fuel cell stack 10 has reached a temperature higher than or equal to the predetermined temperature T0 is repeated.

On the other hand, when the controller 3 determines, on the basis of detection results given by the temperature detector 2, that the temperature of the fuel cell stack 10 has reached a temperature higher than or equal to the predetermined temperature T0, the controller 3 instructs a start of the startup power generation control (Step S111).

When the start of the startup power generation control is instructed, the controller 3 controls the air feeder 21, the fuel feeder 22, and the water feeder 23 to increase the flow rates of the oxidant gas, raw material gas, and reforming gas fed, respectively (Step S112). The controller 3 determines, on the basis of detection results given by the temperature detector 2, whether the temperature of the fuel cell stack 10 has reached the stable power generation temperature T1 (e.g., T1=500° C.) (Step S113).

In Step S113, while the controller 3 determines that the temperature of the fuel cell stack 10 does not reach the stable power generation temperature T1 ("NO" in Step S113), the controller 3 performs control to continuously increase the flow rates of the raw material gas, reforming water, and oxidant gas fed.

On the other hand, in Step S113, when the controller 3 determines that the temperature of the fuel cell stack 10 has reached the stable power generation temperature T1 ("YES" in Step S113), the controller 3 controls the air feeder 21, the fuel feeder 22, and the water feeder 23 to adjust the flow rates of the oxidant gas, raw material gas, and reforming water fed, respectively (Step S114). For example, when the flow rate of the fuel gas (raw material gas) fed is increased to increase the temperature of the fuel cell stack 10, the flow rate of the reforming water is increased in accordance with the flow rate of the fuel gas (raw material gas) such that S/C=about 2.5 is maintained. At the same time, the flow rate of the oxidant gas fed is increased to maintain the air-fuel ratio in the combustor 35 disposed downstream of the fuel cell stack 10. Herein, S/C refers to steam/carbon, which is a ratio of the molar quantity of steam to the molar quantity of carbon in a hydrocarbon component such as city gas or liquefied petroleum gas (LPG) in the raw material gas.

The controller 3 determines, on the basis of detection results given by the temperature detector 2, whether the temperature of the fuel cell stack 10 has reached a temperature higher than or equal to the predetermined temperature T2 (Step S115). While the controller 3 determines that the temperature of the fuel cell stack 10 is lower than the predetermined temperature T2 ("NO" in Step S115), the controller 3 controls the air feeder 21, the fuel feeder 22, and the water feeder 23 to continuously increase the flow rates of the oxidant gas, raw material gas, and reforming water fed, respectively.

On the other hand, when the controller 3 determines, on the basis of detection results given by the temperature detector 2, that the temperature of the fuel cell stack 10 has reached a temperature higher than or equal to the predetermined temperature T2 ("YES" in Step S115), the controller 3 controls the air feeder 21, the fuel feeder 22, and the water feeder 23 to maintain the flow rates of the oxidant gas, raw material gas, and reforming water fed, respectively. By maintaining the flow rates, the fuel cell stack 10 is kept at the predetermined temperature T2.

However, the response of the increase in temperature may be delayed because of the heat capacity of the fuel cell stack 10. Therefore, if the flow rates set when the temperature has reached a temperature higher than or equal to the predetermined temperature T2 are maintained, the temperature is excessively increased in many cases. Therefore, after the temperature reaches a temperature higher than or equal to the predetermined temperature T2, the flow rates may be slightly changed to maintain the predetermined temperature T2, thereby preventing an excessive increase in temperature.

In the fuel cell stack 10, a temperature distribution is generated during operation. Since the temperature detector 2 gives the representative temperature of the fuel cell stack 10, the predetermined temperature T2 may be set using data obtained in advance such that the 475° C. embrittlement elimination control also effectively works in the lowest-temperature portion of the fuel cell stack 10.

For example, the temperature data given by the temperature detector 2 when the lowest temperature of the fuel cell stack 10 (the temperature of the lowest-temperature portion of the fuel cell stack 10) is 600° C. is obtained in advance. In this data obtained in advance, for example, when the temperature detected by the temperature detector 2 when the lowest temperature of the fuel cell stack 10 is 600° C. is 650° C., the predetermined temperature T2 may be set to 650° C.

Furthermore, the controller 3 operates a timer (not illustrated) to measure the elapsed time from the timing at which the temperature of the fuel cell stack 10 has reached a temperature higher than or equal to the predetermined temperature T2. The controller 3 determines whether the predetermined time time1 has elapsed while the temperature of the fuel cell stack 10 is the predetermined temperature T2 (Step S116).

As described above, in the fuel cell system 101, after the temperature of the fuel cell stack 10 reaches a stable power generation temperature T1 of about 500° C., the temperature can be further increased to the predetermined temperature T2. Therefore, even if 475° C. embrittlement is caused through generation of a Cr-rich Fe—Cr phase in the members formed of a ferrite stainless steel, the Cr-rich Fe—Cr phase can be eliminated through transition to a phase before 475° C. embrittlement in which uneven distribution of Fe and Cr is suppressed.

When the controller 3 determines that the predetermined time time1 has not been elapsed while the temperature of the fuel cell stack 10 is the predetermined temperature T2 ("NO" in Step S116), the controller 3 continues the determination whether the predetermined time time1 has elapsed on the basis of measurement results given by the timer. On the other hand, when the controller 3 determines that the predetermined time time1 has elapsed while the temperature of the fuel cell stack 10 is the predetermined temperature T2 ("YES" in Step S116), the controller 3 controls the air feeder 21, the fuel feeder 22, and the water feeder 23 to adjust the flow rates of the oxidant gas, raw material gas, and reforming water fed, respectively (Step S117).

The controller 3 determines, on the basis of detection results given by the temperature detector 2, whether the temperature of the fuel cell stack 10 has reached the stable power generation temperature T1 (Step S118). While the controller 3 determines that the temperature of the fuel cell stack 10 has not reached the stable power generation temperature T1 ("NO" in Step S118), for example, the controller 3 repeats the determination whether the temperature of the fuel cell stack 10 has reached the stable power generation temperature T1 while decreasing the flow rates of the oxidant gas, raw material gas, and reforming water fed.

On the other hand, when the controller 3 determines that the temperature of the fuel cell stack 10 has reached the stable power generation temperature T1 ("YES" in Step S118), the controller 3 executes, for example, a normal power generation control illustrated in FIG. 2.

When the memory unit stores in advance information concerning the relationship between the temperature of the fuel cell stack 10 and the output of the fuel cell stack 10, in Steps S113 and S118, the controller 3 may determine, on the basis of the output of the fuel cell stack 10 (detection results given by a power generation output detector (not illustrated)), whether the temperature of the fuel cell stack 10 has reached the stable power generation temperature T1.

In Step S113, when the controller 3 determines that the temperature of the fuel cell stack 10 has reached the stable power generation temperature T1, the flow rates of the raw material gas, reforming water, and oxidant gas fed are increased such that the temperature of the fuel cell stack 10 reaches a temperature higher than or equal to the predetermined temperature T2. However, Step S113 is not limited to this configuration.

The controller 3 may control the fuel feeder 22 and the water feeder 23 to increase the flow rates of the fuel gas (raw material gas) and reforming water fed. In this case, the flow rate of the reformed gas generated in the reformer 32 can be increased by further increasing the flow rates of the fuel gas (raw material gas) and reforming water fed. The amount of combustion in the combustor 35 in which the anode off-gas and cathode off-gas discharged from the cell 12 are burned is increased by increasing the flow rate of the reformed gas fed to the cell 12, thereby increasing the temperature of the fuel cell stack 10. Alternatively, the controller 3 may control the air feeder 21 such that the flow rate of the oxidant gas fed is decreased. In this case, the temperature drop of the fuel cell stack 10 due to the oxidant gas can be suppressed by decreasing the amount of oxidant gas fed to the fuel cell stack 10, thereby increasing the temperature of the fuel cell stack 10.

In the case where the controller 3 controls the fuel feeder 22 and the water feeder 23 to increase the flow rates of the fuel gas (raw material gas) and reforming water fed, the controller 3 performs control to decrease the flow rates of the fuel gas (raw material gas) and reforming water fed in Step S117. In the case where the controller 3 controls the air feeder 21 to decrease only the flow rate of the oxidant gas fed, the controller 3 controls the air feeder 21 to increase only the flow rate of the oxidant gas (air) fed in Step S117.
475° C. embrittlement elimination control during power generation Next, the 475° C. embrittlement elimination control during power generation periodically performed at particular intervals during the power generation control in the fuel cell system 101 will be described with reference to FIG. 10 and FIG. 11.

During the power generation control in the fuel cell system 101, the controller 3 operates a timer (not illustrated) to measure the elapsed time from the last timing at which the temperature of the fuel cell stack 10 has reached the stable power generation temperature T1. The controller 3 determines, on the basis of measurement results given by the timer, whether the predetermined time time2 has elapsed from the timing at which the temperature of the fuel cell stack 10 has reached the stable power generation temperature T1 (Step S130).

While the controller 3 determines that the predetermined time time2 has not elapsed from the timing at which the temperature of the fuel cell stack 10 has reached the stable power generation temperature T1 ("NO" in Step S130), the controller 3 repeats the determination process in Step S130. On the other hand, when the controller 3 determines, on the basis of measurement results given by the timer, that the predetermined time time2 has elapsed from the timing at which the temperature of the fuel cell stack 10 has reached the stable power generation temperature T1 ("YES" in Step S130), the controller 3 instructs a start of an increase in temperature of the fuel cell system 101 (Step S131). The controller 3 controls the air feeder 21, the fuel feeder 22, and the water feeder 23 to adjust the flow rates of the oxidant gas, raw material gas, and reforming water fed, respectively (Step S132). The following processes (processes from Step S133 to Step S136) are the same as the processes from Step S115 to Step S118 of the 475° C. embrittlement elimination control during startup in FIG. 9, and thus the description thereof is omitted.

In Step S136, when the controller 3 determines that the temperature of the fuel cell stack 10 has reached the stable power generation temperature T1 and executes a normal power generation control, the controller 3 resets, to zero, a counter of the timer used to determine whether the predetermined time time2 has elapsed. The elapsed time from the timing at which the temperature of the fuel cell stack 10 has reached the stable power generation temperature T1 is measured again. After the 475° C. embrittlement elimination control during power generation is performed and then the predetermined time time2 has elapsed from the timing at which the temperature of the fuel cell stack 10 has reached the stable power generation temperature T1, the 475° C. embrittlement elimination control during power generation is performed again.

When the memory unit stores in advance information concerning the relationship between the temperature of the fuel cell stack 10 and the output of the fuel cell stack 10, in Step S136, the controller 3 may determine, on the basis of the output of the fuel cell stack 10 (detection results given by a power generation output detector (not illustrated)), whether the temperature of the fuel cell stack 10 has reached the stable power generation temperature T1.

In Step S131, after the controller 3 instructs a start of an increase in temperature, the flow rates of the fuel gas (raw material gas), reforming water, and oxidant gas fed are increased such that the temperature of the fuel cell stack 10 reaches a temperature higher than or equal to the predetermined temperature T2. However, Step S131 is not limited to this configuration.

The controller 3 may control the fuel feeder 22 and the water feeder 23 to increase the flow rates of the fuel gas (raw material gas) and reforming water fed. In this case, the flow rate of the reformed gas generated in the reformer 32 can be increased by further increasing the flow rates of the fuel gas (raw material gas) and reforming water fed. The amount of combustion in the combustor 35 in which the anode off-gas and cathode off-gas discharged from the cell 12 are burned is increased by increasing the flow rate of the reformed gas fed, thereby increasing the temperature of the fuel cell stack 10. Alternatively, the controller 3 may control the air feeder 21 to decrease the flow rate of the oxidant gas fed. In this case, the temperature drop of the fuel cell stack 10 due to the oxidant gas can be suppressed by decreasing the amount of oxidant gas fed to the fuel cell stack 10, thereby increasing the temperature of the fuel cell stack 10.

In the case where the controller 3 controls the fuel feeder 22 and the water feeder 23 to increase the flow rates of the fuel gas (raw material gas) and reforming water fed, the controller 3 performs control to decrease the flow rates of the fuel gas (raw material gas) and reforming water fed in Step S135. In the case where the controller 3 controls the air feeder 21 to decrease only the flow rate of the oxidant gas fed in Step S132, the controller 3 controls the air feeder 21 to increase the flow rate of the oxidant gas (air) fed in Step S135.

As described above, in the fuel cell system 101 according to the second embodiment of the present disclosure, the 475° C. embrittlement elimination control can be periodically performed at particular intervals (predetermined time time2) from the timing at which electric power corresponding to the target power generation load can be generated in the fuel cell system 101 during the power generation control (e.g., the timing at which the temperature of the fuel cell stack 10 has reached the stable power generation temperature T1). Therefore, even if the 475° C. embrittlement is caused through generation of a Cr-rich Fe—Cr phase in the members formed of a ferrite stainless steel during the power generation control in the fuel cell system 101, the Cr-rich Fe—Cr phase can be eliminated through transition to a phase before 475° C. embrittlement in which uneven distribution of Fe and Cr is suppressed. Therefore, the stainless steel members in the fuel cell system 101 can be prevented from being broken because of the influence of 475° C. embrittlement.

Stainless Steel Member

The constituted members that can be formed of stainless steel in the fuel cell systems 100 and 101 are the fuel cell stack 10, the combustor 35, and the first heat exchanger 33 in FIG. 1 and FIG. 7, the second heat exchanger 34 in FIG. 1, and the reformer 32 and the evaporator 31 in FIG. 7. The hot box 30 serving as a casing that houses these members can also be formed of stainless steel.

When the fuel cell stack 10 has a flat-plate shape, examples of constituted members formed of a ferrite stainless steel in the fuel cell stack 10 include separators, interconnectors, air electrode current collectors, fuel electrode current collectors, bus bars, end plates, and fuel electrode frames.

The separator is a member that separates an air flow path and a fuel flow path in the fuel cell stack 10. The interconnector is a member that electrically connects different cells 12 to each other and separates a fuel gas (hydrogen) from an oxidant gas (air). The interconnector can be used by coating the surface with, for example, a $(Mn,Co)_3O_4$ spinel oxide.

The air electrode current collector and the fuel electrode current collector are members that electrically connect the air electrode and the fuel electrode to an electron passage, respectively, and can be used by coating the surface with, for example, a $(Mn,Co)_3O_4$ spinel oxide. The bus bar is a terminal member for each of a positive terminal and a negative terminal through which electric power is taken from the fuel cell stack 10.

The end plate is a member that mechanically holds both ends of the fuel cell stack 10.

The cell 12 may be mechanically supported by a metal support. When the cell 12 is supported by a metal support, the metal support may be formed of a ferrite stainless steel.

The Cr content in the above stainless steel members may be 10.5 mass % or more. The Cr content is preferably 10.5 mass % or more and 50 mass % or less and more preferably 10.5 mass % or more and 32 mass % or less from the viewpoint of production cost. The ferrite stainless steel can be replaced with an Fe—Cr alloy having a Cr content of more than 32 mass % to improve the corrosion resistance.

An example of the ferrite stainless steel for forming separators, end plates, the reformer 32, the hot box 30, and the like is "NCA-1" (NIPPON STEEL Stainless Steel Corporation, representative composition: 18Cr-3Al—Ti—Mn—Ni—Si). Examples of the ferrite stainless steel for forming fuel electrode current collectors, air electrode current collectors, interconnectors, metal supports, and the like include ferrite stainless steels obtained by coating "ZMG232G10" (Hitachi Metals, Ltd., representative composition: 24Cr—Mn—Zr—W—Cu), "Crofer 22APU" (ThyssenKrupp AG, representative composition: 22Cr—Mn—N), or "NSSC-220ECO" (NIPPON STEEL Stainless Steel Corporation, representative composition: 24Cr—Mn—Mo—W—Mo—N) with, for example, a $(Mn,Co)_3O_4$ spinel oxide.

In each of the fuel cell system 100 according to the first embodiment and the fuel cell system 101 according to the second embodiment, at least one of the 475° C. embrittlement elimination control during startup and the 475° C. embrittlement elimination control during power generation may be performed. From the viewpoint of more considerably eliminating 475° C. embrittlement, both the 475° C. embrittlement elimination control during startup and the 475° C. embrittlement elimination control during power generation are suitably performed in combination.

In the fuel cell system 100 according to the first embodiment and the fuel cell system 101 according to the second embodiment, when at least one of the 475° C. embrittlement elimination control during startup and the 475° C. embrittlement elimination control during power generation is performed, the amount of heat dissipated from the hot box 30 increases with increasing the temperature of the fuel cell stack 10. This increases the temperature in a fuel cell system package. Therefore, when at least one of the 475° C. embrittlement elimination control during startup and the 475° C. embrittlement elimination control during power generation is performed, the amount of ventilation performed by a ventilating fan (not illustrated) disposed to adjust the temperature inside the fuel cell system package may be increased.

When at least one of the 475° C. embrittlement elimination control during startup and the 475° C. embrittlement elimination control during power generation is performed, the temperature of the combustion exhaust gas discharged from the hot box 30 is also increased. Therefore, when heat of the combustion exhaust gas is collected using, for example, stored hot water, the amount of stored hot water circulated may be increased.

When the fuel cell stack 10 is heated from the stable power generation temperature T1 (first predetermined temperature) to the predetermined temperature T2 (second predetermined temperature) and when the fuel cell stack 10 is kept at the predetermined temperature T2, the output of the ventilating fan (not illustrated) in a system package may be increased to increase the amount of heat exchange such that the temperature in a package of the fuel cell system 101 is substantially the same as the stable power generation temperature T1. Herein, the package of the fuel cell system 101 refers to a whole assembly of the fuel cell system 101, such as Enefarm (not illustrated), that includes auxiliary devices such as the air feeder 21, the fuel feeder 22, the water feeder 23, and the controller 3 and the hot box 30. From the viewpoint of the heat resistance and the operation guarantee of the auxiliary devices, the temperature in the package of the fuel cell system 101 is preferably controlled to lower than 45° C. Therefore, the ventilating fan (not illustrated) included in the fuel cell system 101 is operated to introduce outside air into the package of the fuel cell system 101 and replace air inside the package with the outside air, thereby controlling the temperature in the package of the fuel cell system 101.

The present disclosure is not limited to the above embodiments. Various changes can be made within the scope of the claims, and different embodiments and embodiments obtained by appropriately combining techniques disclosed in a plurality of modifications are also included in the technical scope of the present disclosure.

The fuel cell system according to embodiments of the present disclosure can be applied to any fuel cell system that steadily operates in a temperature range of 400° C. to 550° C. and includes members susceptible to 475° C. embrittlement. The present disclosure can also be applied to, in addition to fuel cell systems, general electrochemical systems that use proton conductors, such as steam electrolysis, electrochemical hydrogen pumps (pressure boosters/accumulators), electrochemical hydrogen purifiers, and hydrogen sensors.

What is claimed is:

1. A fuel cell system comprising:
   a fuel cell stack constituted by a plurality of cells, each of the cells including a fuel electrode, an air electrode, and an electrolyte, and generating electric power through a reaction of a fuel gas and air;
   a casing that houses the fuel cell stack;
   a temperature detector that detects a first temperature, the first temperature being a temperature of the fuel cell stack or a temperature inside the casing; and
   a controller that is programmed based on the first temperature to allow an operation at a first predetermined temperature, and is programmed to control such that the first temperature reaches and maintains a temperature higher than or equal to a second predetermined temperature for a predetermined time, and programmed to then decrease the first temperature to the first predetermined temperature,
   wherein the second predetermined temperature is a temperature at which 475° C. embrittlement that occurs on stainless steel is eliminated,
   the first predetermined temperature is lower than the second predetermined temperature, and
   the fuel cell stack, the casing that houses the fuel cell stack, and at least one of members disposed in the casing together with the fuel cell stack are formed of stainless steel.

2. The fuel cell system according to claim 1, further comprising:
   a fuel feeder that feeds the fuel gas to the fuel electrode; and
   an air feeder that feeds an oxidant gas to the air electrode,
   wherein the controller is further programmed to control at least one of an amount of the fuel gas fed by the fuel feeder and an amount of the oxidant gas fed by the air feeder such that the first temperature detected by the temperature detector reaches a temperature higher than or equal to the second predetermined temperature.

3. The fuel cell system according to claim 2, comprising:
   at least one of a combustor in which an anode off-gas discharged from the fuel electrode of the cells and a cathode off-gas discharged from the air electrode are burned and a combustion space having a combustion function,
   wherein the controller is further programmed to control an amount of the fuel gas fed by the fuel feeder such that a temperature of the fuel cell stack reaches a temperature higher than or equal to the second predetermined temperature for the predetermined time.

4. The fuel cell system according to claim 2, wherein the controller is further programmed to control an amount of the oxidant gas fed by the air feeder such that a temperature of the fuel cell stack reaches a temperature higher than or equal to the second predetermined temperature for the predetermined time.

5. The fuel cell system according to claim 1, wherein the second predetermined temperature is 590° C. or higher.

6. The fuel cell system according to claim 1, wherein the predetermined time is 1 minute to 60 minutes.

7. The fuel cell system according to claim 2, wherein the controller is further programmed to control at least one of an amount of the fuel gas fed by the fuel feeder and an amount of the oxidant gas fed by the air feeder during power generation such that a temperature of the fuel cell stack periodically reaches, at particular intervals, a temperature higher than or equal to the second predetermined temperature for the predetermined time.

8. The fuel cell system according to claim 1, wherein the electrolyte in the cells constituting the fuel cell stack is a proton conductor.

9. The fuel cell system according to claim 1, wherein the electrolyte is formed of $Ba_xZr_yM_zO_{3-\sigma}$, where M is at least one element selected from the group consisting of Sc, In, Lu, Yb, Tm, Er, Y, Ho, Dy, and Gd and $0.9 \leq x \leq 1.0$, $0.6 \leq y \leq 0.90$, $0.1 \leq z \leq 0.4$, and $2.70 \leq 3-\sigma \leq 2.95$ are satisfied.

10. The fuel cell system according to claim 1, wherein the fuel cell stack is constituted by cells including a metal support.

11. An electrochemical system comprising:
    an electrochemical stack constituted by a plurality of cells, each of the cells including a fuel electrode, an air electrode, and an electrolyte, and generating electric power through a reaction of a fuel gas and air;
    a casing that houses the electrochemical stack;
    a temperature detector that detects a first temperature, the first temperature being a temperature of the electrochemical stack or a temperature inside the casing; and
    a controller that is programmed based on the first temperature to allow an operation at a first predetermined temperature, and is programmed to control such that the first temperature reaches and is maintained at a temperature higher than or equal to a second predetermined temperature for a predetermined time, and programmed to then decrease the first temperature to the first predetermined temperature,
    wherein the second predetermined temperature is a temperature at which 475° C. embrittlement that occurs on stainless steel is eliminated,
    the first predetermined temperature is lower than the second predetermined temperature, and
    the fuel cell stack, the casing that houses the fuel cell stack, and at least one of members disposed in the casing together with the fuel cell stack are formed of stainless steel.

* * * * *